(12) United States Patent
Jacquemetton et al.

(10) Patent No.: US 12,151,316 B2
(45) Date of Patent: *Nov. 26, 2024

(54) METHODS AND SYSTEMS FOR QUALITY INFERENCE AND CONTROL FOR ADDITIVE MANUFACTURING PROCESSES

(71) Applicant: DIVERGENT TECHNOLOGIES, INC., Los Angeles, CA (US)

(72) Inventors: Lars Jacquemetton, Santa Fe, NM (US); Vivek R. Dave, Concord, NH (US); Mark J. Cola, Santa Fe, NM (US); Glenn Wikle, Santa Fe, NM (US); R. Bruce Madigan, Butte, MT (US)

(73) Assignee: DIVERGENT TECHNOLOGIES, INC., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/895,904

(22) Filed: Aug. 25, 2022

(65) Prior Publication Data

US 2023/0127650 A1 Apr. 27, 2023

Related U.S. Application Data

(63) Continuation of application No. 16/182,478, filed on Nov. 6, 2018, now Pat. No. 11,517,984.
(Continued)

(51) Int. Cl.
*B23K 31/12* (2006.01)
*B23K 26/342* (2014.01)
*B33Y 10/00* (2015.01)

(52) U.S. Cl.
CPC .......... *B23K 31/125* (2013.01); *B23K 26/342* (2015.10); *B33Y 10/00* (2014.12)

(58) Field of Classification Search
CPC ...... B22F 2203/11; B22F 10/20; B22F 10/30; B22F 12/00; B23K 26/342; B23K 31/125;
(Continued)

(56) References Cited

U.S. PATENT DOCUMENTS

| 5,552,575 A | 9/1996 | Doumanidis |
| 6,055,060 A | 4/2000 | Bolduan et al. |

(Continued)

FOREIGN PATENT DOCUMENTS

| CN | 1135732 A | 11/1996 |
| CN | 1976800 A | 6/2007 |

(Continued)

OTHER PUBLICATIONS

U.S. Appl. No. 17/555,065, "Non-Final Office Action", Jun. 29, 2023, 10 pages.
(Continued)

*Primary Examiner* — Chun Cao
(74) *Attorney, Agent, or Firm* — FisherBroyles, LLP

(57) ABSTRACT

This disclosure describes an additive manufacturing method that includes monitoring a temperature of a portion of a build plane during an additive manufacturing operation using a temperature sensor as a heat source passes through the portion of the build plane; detecting a peak temperature associated with one or more passes of the heat source through the portion of the build plane; determining a threshold temperature by reducing the peak temperature by a predetermined amount; identifying a time interval during which the monitored temperature exceeds the threshold temperature; identifying, using the time interval, a change in manufacturing conditions likely to result in a manufacturing defect; and changing a process parameter of the heat source in response to the change in manufacturing conditions.

13 Claims, 20 Drawing Sheets

Related U.S. Application Data

(60) Provisional application No. 62/582,792, filed on Nov. 7, 2017, provisional application No. 62/633,487, filed on Feb. 21, 2018, provisional application No. 62/643,457, filed on Mar. 15, 2018.

(58) Field of Classification Search
CPC ...... B23K 26/032; B33Y 10/00; B33Y 30/00; B33Y 50/02; B29C 64/153; B29C 64/393; G01N 2021/8845; G01N 21/8806
USPC .......................................................... 700/117
See application file for complete search history.

(56) References Cited

U.S. PATENT DOCUMENTS

| | | | |
|---|---|---|---|
| 6,313,913 B1 | 11/2001 | Nakagawa et al. | |
| 6,707,554 B1 | 3/2004 | Miltner et al. | |
| 6,930,278 B1 | 8/2005 | Chung et al. | |
| 7,515,986 B2 | 4/2009 | Huskamp | |
| 8,137,739 B2 | 3/2012 | Philippi et al. | |
| 9,254,682 B2 | 2/2016 | Duke et al. | |
| 9,533,375 B2 | 1/2017 | Cho et al. | |
| 9,925,715 B2 | 3/2018 | Cheverton et al. | |
| 9,977,425 B1 | 5/2018 | McCann et al. | |
| 10,207,363 B2 | 2/2019 | Craig et al. | |
| 10,207,489 B2 | 2/2019 | Dave et al. | |
| 10,232,443 B2 * | 3/2019 | Myerberg | B22F 12/55 |
| 10,254,754 B2 | 4/2019 | McCann et al. | |
| 10,705,509 B2 | 7/2020 | Snyder et al. | |
| 10,725,459 B2 | 7/2020 | Good et al. | |
| 10,766,199 B2 | 9/2020 | Yoshinari | |
| 10,786,948 B2 * | 9/2020 | Dave | B22F 10/00 |
| 10,831,180 B2 | 11/2020 | Gold | |
| 10,850,326 B2 | 12/2020 | Ashton et al. | |
| 11,517,984 B2 * | 12/2022 | Jacquemetton | B23K 31/125 |
| 2003/0234239 A1 | 12/2003 | Lee et al. | |
| 2004/0164165 A1 | 8/2004 | Havens et al. | |
| 2004/0200816 A1 | 10/2004 | Chung et al. | |
| 2004/0247170 A1 | 12/2004 | Furze et al. | |
| 2005/0011867 A1 | 1/2005 | Okuda et al. | |
| 2007/0276187 A1 | 11/2007 | Wiklof et al. | |
| 2008/0262659 A1 | 10/2008 | Huskamp | |
| 2008/0273758 A1 | 11/2008 | Fuchs et al. | |
| 2009/0206065 A1 | 8/2009 | Kruth et al. | |
| 2009/0268029 A1 | 10/2009 | Haussmann et al. | |
| 2010/0140236 A1 | 6/2010 | Cai et al. | |
| 2010/0249979 A1 | 9/2010 | John et al. | |
| 2010/0256945 A1 | 10/2010 | Murata | |
| 2011/0001812 A1 | 1/2011 | Kang et al. | |
| 2011/0254811 A1 | 10/2011 | Lawrence et al. | |
| 2012/0100031 A1 | 4/2012 | Ljungblad | |
| 2012/0283712 A1 | 11/2012 | Youngquist et al. | |
| 2012/0287443 A1 | 11/2012 | Lin et al. | |
| 2012/0327428 A1 | 12/2012 | Hellwig et al. | |
| 2013/0105447 A1 | 5/2013 | Haake | |
| 2013/0305357 A1 | 11/2013 | Ayyagari et al. | |
| 2014/0265040 A1 | 9/2014 | Batchelder | |
| 2014/0265046 A1 | 9/2014 | Burris et al. | |
| 2014/0271328 A1 | 9/2014 | Burris et al. | |
| 2014/0314613 A1 | 10/2014 | Hopkinson et al. | |
| 2015/0004045 A1 | 1/2015 | Ljungblad | |
| 2015/0048058 A1 | 2/2015 | Bruck et al. | |
| 2015/0048064 A1 | 2/2015 | Cheverton et al. | |
| 2015/0170501 A1 | 6/2015 | Mukherji et al. | |
| 2015/0268099 A1 | 9/2015 | Craig et al. | |
| 2015/0306819 A1 | 10/2015 | Ljungblad | |
| 2016/0082662 A1 | 3/2016 | Majer | |
| 2016/0096236 A1 | 4/2016 | Cho et al. | |
| 2016/0151859 A1 | 6/2016 | Sparks | |
| 2016/0167160 A1 | 6/2016 | Hellestam | |
| 2016/0184893 A1 | 6/2016 | Dave et al. | |
| 2016/0185048 A1 | 6/2016 | Dave et al. | |
| 2016/0228987 A1 | 8/2016 | Baudimont et al. | |
| 2016/0236279 A1 | 8/2016 | Ashton et al. | |
| 2016/0302148 A1 | 10/2016 | Buck et al. | |
| 2016/0325541 A1 | 11/2016 | Lavrentyev et al. | |
| 2016/0332366 A1 | 11/2016 | Donovan | |
| 2016/0347005 A1 | 12/2016 | Miller | |
| 2017/0016781 A1 | 1/2017 | Dave et al. | |
| 2017/0090462 A1 | 3/2017 | Dave et al. | |
| 2017/0102689 A1 | 4/2017 | Khajepour et al. | |
| 2017/0131388 A1 | 5/2017 | Campbell et al. | |
| 2017/0151628 A1 | 6/2017 | Craig et al. | |
| 2017/0165751 A1 | 6/2017 | Buller et al. | |
| 2017/0173692 A1 * | 6/2017 | Myerberg | B33Y 30/00 |
| 2017/0173737 A1 | 6/2017 | Gray | |
| 2017/0217104 A1 | 8/2017 | Cortes I Herms et al. | |
| 2017/0239892 A1 | 8/2017 | Buller et al. | |
| 2017/0246810 A1 | 8/2017 | Gold | |
| 2017/0266762 A1 | 9/2017 | Dave et al. | |
| 2017/0274599 A1 | 9/2017 | Kitamura et al. | |
| 2017/0326867 A1 | 11/2017 | Hartke et al. | |
| 2017/0328807 A1 | 11/2017 | Kwon | |
| 2017/0334144 A1 | 11/2017 | Fish et al. | |
| 2017/0368640 A1 | 12/2017 | Herzog et al. | |
| 2018/0020207 A1 | 1/2018 | Sugimura et al. | |
| 2018/0169948 A1 | 6/2018 | Coeck et al. | |
| 2018/0186079 A1 | 7/2018 | Vilajosana et al. | |
| 2018/0229303 A1 | 8/2018 | Burlatsky et al. | |
| 2018/0281286 A1 | 10/2018 | Vilajosana et al. | |
| 2018/0345649 A1 | 12/2018 | Prakash | |
| 2019/0009463 A1 | 1/2019 | Vilajosana et al. | |
| 2019/0022946 A1 | 1/2019 | Jones et al. | |
| 2019/0039318 A1 | 2/2019 | Madigan et al. | |
| 2019/0047226 A1 | 2/2019 | Ishikawa et al. | |
| 2019/0095555 A1 | 3/2019 | Lopez et al. | |
| 2019/0113398 A1 | 4/2019 | Comas et al. | |
| 2019/0118300 A1 | 4/2019 | Penny et al. | |
| 2019/0128738 A1 | 5/2019 | Lo et al. | |
| 2019/0217416 A1 | 7/2019 | Brochu | |
| 2020/0064289 A1 | 2/2020 | Huang et al. | |
| 2021/0078076 A1 | 3/2021 | Jurg et al. | |

FOREIGN PATENT DOCUMENTS

| | | |
|---|---|---|
| CN | 201915148 U | 8/2011 |
| CN | 104470703 A | 3/2015 |
| CN | 104640667 A | 5/2015 |
| CN | 105058788 A | 11/2015 |
| CN | 105499569 A | 4/2016 |
| CN | 105745060 A | 7/2016 |
| CN | 106794605 A | 5/2017 |
| CN | 107107481 A | 8/2017 |
| CN | 111107974 A | 5/2020 |
| DE | 102009015282 A1 | 10/2010 |
| DE | 102014208768 A1 | 12/2015 |
| DE | 102015011013 A1 | 2/2016 |
| DE | 102016011801 A1 | 4/2018 |
| EP | 3127635 A1 | 2/2017 |
| EP | 3070554 B1 | 2/2018 |
| EP | 3527352 A1 | 8/2019 |
| JP | 2006513055 A | 4/2006 |
| JP | 2015199195 A | 11/2015 |
| JP | 2016540109 A | 12/2016 |
| JP | 2016540895 A | 12/2016 |
| JP | 2020530070 A | 10/2020 |
| KR | 101697530 B1 | 1/2017 |
| WO | 2015121730 A1 | 8/2015 |
| WO | 2016050319 A1 | 4/2016 |
| WO | 2016168172 A1 | 10/2016 |
| WO | 2017071741 A1 | 5/2017 |
| WO | 2017186850 A1 | 11/2017 |
| WO | 2018087556 A1 | 5/2018 |

OTHER PUBLICATIONS

U.S. Appl. No. 17/839,853, "Non-Final Office Action", Mar. 16, 2023, 9 pages.
JP2022-015272, "Office Action", Feb. 20, 2023, 8 pages.
U.S. Appl. No. 16/052,488, "Ex Parte Quayle Action", Dec. 20, 2018, 6 pages.
U.S. Appl. No. 16/052,488, "Non-Final Office Action", May 1, 2019, 17 pages.

(56) References Cited

OTHER PUBLICATIONS

U.S. Appl. No. 16/052,488, "Notice of Allowance", Aug. 9, 2019, 6 pages.
U.S. Appl. No. 16/182,462, "Non-Final Office Action", Mar. 25, 2021, 18 pages.
U.S. Appl. No. 16/182,462, "Notice of Allowance", Sep. 24, 2021, 12 pages.
U.S. Appl. No. 16/182,478, "Notice of Allowance", May 25, 2022, 10 pages.
U.S. Appl. No. 16/282,004, "Non-Final Office Action", Nov. 8, 2019, 16 Pages.
U.S. Appl. No. 16/282,004, "Notice of Allowance", Mar. 9, 2020, 14 pages.
U.S. Appl. No. 16/282,016, "Final Office Action", Feb. 21, 2020, 16 pages.
U.S. Appl. No. 16/282,016, "Non-Final Office Action", Sep. 3, 2019, 14 pages.
U.S. Appl. No. 16/282,016, "Notice of Allowance", May 27, 2020, 9 pages.
U.S. Appl. No. 16/574,388, "Non-Final Office Action", Nov. 19, 2021, 9 pages.
U.S. Appl. No. 16/574,388, "Notice of Allowance", Mar. 30, 2022, 9 pages.
U.S. Appl. No. 16/831,232, "Non-Final Office Action", Oct. 27, 2022, 20 pages.
U.S. Appl. No. 17/003,330, "Notice of Allowance", Sep. 24, 2021, 10 pages.
U.S. Appl. No. 17/555,065, "Non-Final Office Action", Oct. 27, 2022, 10 pages.
U.S. Appl. No. 17/847,038, "Final Office Action", Jan. 11, 2023, 22 pages.
U.S. Appl. No. 17/847,038, "Non-Final Office Action", Sep. 6, 2022, 23 pages.
Bockh, et al., "Wärmeübertragung", Grundlagen und Praxis, Springer, 2014, 322 pages.
CN201880064101.1, "Notice of Decision to Grant", Jul. 5, 2022, 6 pages.
CN201880064101.1, "Office Action", Feb. 28, 2022, 7 pages.
CN201880064101.1, "Office Action", Jul. 5, 2021, 15 pages.
CN201980027059.0, "Notice of Decision to Grant", Jan. 29, 2022, 4 pages.
CN201980027059.0, "Office Action", Jun. 11, 2021, 8 pages.
CN201980027181.8, "Notice of Decision to Grant", Jan. 11, 2022, 4 pages.
CN201980027181.8, "Office Action", Jun. 30, 2021, 8 pages.
DE102018127678.8, "Office Action", Nov. 9, 2022, 13 pages.
DE102018127695.8, "Office Action", Aug. 24, 2021, 6 pages.
DE112018001597.1, "Notice of Decision to Grant", Feb. 25, 2021, 9 pages.
DE112018001597.1, "Office Action", Jul. 15, 2020, 6 pages.
DE112018007925.2, "Office Action", Feb. 3, 2022, 7 pages.
DE112019000498.0, "Notice of Decision to Grant", Mar. 3, 2022, 6 pages.
DE112019000498.0, "Office Action", Mar. 2, 2021, 9 pages.
DE112019000521.9, "Notice of Decision to Grant", Oct. 28, 2021, 9 pages.
DE112019000521.9, "Office Action", Jun. 25, 2021, 3 pages.
EP18840578.1, "Extended European Search Report", Nov. 5, 2019, 8 pages.
EP18840578.1, "Office Action", Jul. 7, 2022, 4 pages.
EP18840578.1, "Office Action", Mar. 12, 2021, 5 pages.
JP2020-529102, "Notice of Allowance", Jan. 4, 2022, 3 pages.
JP2020-529102, "Office Action", Apr. 30, 2021, 14 pages.
KR10-2020-7005720, "Notice of Decision to Grant", Sep. 15, 2021, 8 pages.
KR10-2020-7005720, "Office Action", Mar. 8, 2021, 6 pages.
PCT/US2018/044884, "International Preliminary Report on Patentability", Feb. 13, 2020, 7 pages.
PCT/US2018/044884, "International Search Report and Written Opinion", Oct. 15, 2018, 8 pages.
PCT/US2019/019009, "International Preliminary Report on Patentability", Sep. 3, 2020, 6 pages.
PCT/US2019/019009, "International Search Report and Written Opinion", May 8, 2019, 7 pages.
PCT/US2019/019016, "International Preliminary Report on Patentability", Sep. 3, 2020, 7 pages.
PCT/US2019/019016, "International Search Report and Written Opinion", May 16, 2019, 8 pages.
Non-Final Office Action in U.S. Appl. No. 17/555,065, mailed Jul. 29, 2024, 11 pages.

\* cited by examiner

METHODS AND SYSTEMS FOR QUALITY INFERENCE AND CONTROL FOR ADDITIVE MANUFACTURING PROCESSES

CROSS-REFERENCE TO RELATED APPLICATIONS

This application is a continuation of U.S. patent application Ser. No. 16/182,478, filed on Nov. 6, 2018; which claims priority to U.S. Provisional Patent Applications No. 62/582,792, filed on Nov. 7, 2017, 62/633,487, filed on Feb. 21, 2018 and 62/643,457, filed on Mar. 15, 2018. The disclosures of which are hereby incorporated by reference in their entirety and for all purposes.

BACKGROUND OF THE INVENTION

Additive manufacturing, or the sequential assembly or construction of a part through the combination of material addition and applied energy, takes on many forms and currently exists in many specific implementations and embodiments. Additive manufacturing can be carried out by using any of a number of various processes that involve the formation of a three dimensional part of virtually any shape. The various processes include the sintering of a liquid material layer by layer using ultraviolet light; the curing of a powdered material layer by layer using a high powered laser; or the melting of granular raw material layer by layer using an electron beam. Unfortunately, established processes for determining a quality of a resulting part manufactured in this way are limited. Conventional quality assurance testing generally involves post-manufacturing destruction of the part. While destructive testing is an accepted way of validating a part's quality, as it allows for close scrutiny of various internal portions of the part, such tests cannot for obvious reasons be applied to a production part. Consequently, methods and systems for non-destructively verifying the integrity of a part produced by additive manufacturing are desired.

SUMMARY OF THE INVENTION

The described embodiments are related to a large subcategory of additive manufacturing that involves using an energy source that takes the form of a moving region of intense thermal energy. In the event that this thermal energy causes physical melting of the added material, then these processes are known broadly as welding processes. In welding processes, the material, which is incrementally and sequentially added, is melted by the energy source in a manner similar to a fusion weld.

When the added material takes the form of layers of powder, after each incremental layer of powder material is sequentially added to the part being constructed, the heat source melts the incrementally added powder by welding regions of the powder layer creating a moving molten region, hereinafter referred to as the weld pool, so that upon solidification they become part of the previously sequentially added and melted and solidified layers below the new layer that includes the part being constructed. As additive machining processes can be lengthy and include any number of passes of the weld pool, it can be difficult to avoid at least slight variations in the size and temperature of the weld pool as the weld pool is used to solidify the part. It should be noted that additive manufacturing processes are typically driven by one or more processors associated with a computer numerical control (CNC) due to the high rates of travel of the heating element and complex patterns needed to form a three dimensional structure.

An overall object of the described embodiments is to apply optical sensing techniques such as, e.g., quality inference, process control, or both, to additive manufacturing processes. Optical sensors can be used to track the evolution of in-process physical phenomena by tracking the evolution of their associated in-process physical variables. Herein optical can include that portion of the electromagnetic spectrum which include near infrared (IR), visible and well as near ultraviolet (UV). Generally the optical spectrum, also referred to as the visible spectrum, is considered to go from 380 nm to 780 nm in terms of wavelength. However near UV and IR could extend as low as 1 nm and as high as 3000 nm in terms of wavelength, respectively. Sensor readings collected from optical sensors can be used to determine in process quality metrics (IPQMs). One such IPQM is the Half Power Bandwidth (HPBW) based on thermal data collected by a pyrometer or photodiode.

HPBW is a metric that is sensitive to changes in user-defined laser powder bed fusion process parameters such as beam power, beam travel speed, hatch spacing, and the like. The HPBW can be used to determine the position of the field of view of a pyrometer relative to the laser scan pattern and hatch size. The HPBW can be used for analysis using IPQM comparison to a baseline dataset. The resulting IPQM can be calculated for each scan and displayed. IPQM comparisons to the baseline dataset can be indicative of manufacturing defects and can be used to generate control signals for process parameters. The HPBW more accurately estimates the correct thermal profile from data collected by the pyrometer.

An additive manufacturing method is disclosed and includes monitoring a temperature of a portion of a build plane during an additive manufacturing operation using a temperature sensor as a heat source passes through the portion of the build plane. The method further includes detecting a peak temperature associated with one or more passes of the heat source through the portion of the build plane and determining a threshold temperature by reducing the peak temperature by a predetermined amount. The method uses the threshold temperature to identify a time interval during which the monitored temperature exceeds the threshold temperature and identifies, using the time interval, a change in manufacturing conditions likely to result in a manufacturing defect. The method changes one or more process parameters associated with the heat source in response to the change in manufacturing conditions.

An additive manufacturing method is disclosed and includes performing an additive manufacturing operation using an energy source and receiving voltage data associated with a stationary photodiode during a scan of the energy source across a portion of a powder bed to produce a part. The method further includes detecting a peak voltage associated with one or more passes of the energy source through the portion of the powder bed and determining a threshold voltage by reducing the peak voltage by a predetermined amount. The method further includes identifying a time interval during which the voltage data exceeds the threshold voltage and identifying, using the time interval, a change in manufacturing conditions likely to result in a manufacturing defect. The method changes a process parameter of the energy source in response to the change in manufacturing conditions.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION OF SPECIFIC EMBODIMENTS

Figure 1A:
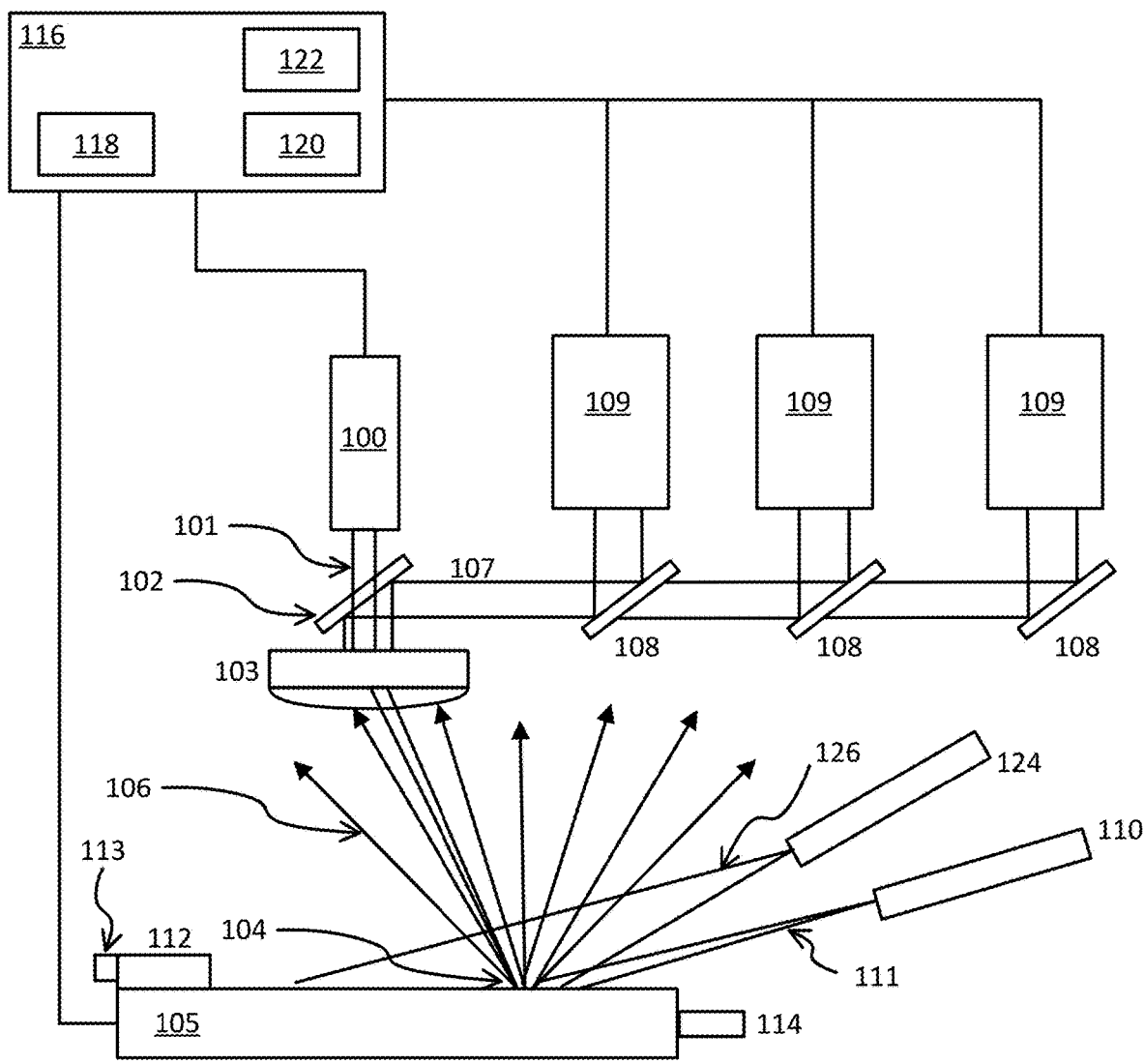
FIG. 1A is a schematic illustration of a system with an intense heat source, in this specific instance taken to be a laser beam.

FIG. 1A shows an embodiment of an additive manufacturing system that uses one or more optical sensing apparatus to determine the Half Power Bandwidth (HPBW). The HPBW is sensitive to changes in process parameters such as, for example, energy source power, energy source speed, and hatch spacing. The additive manufacturing system of FIG. 1A uses a laser 100 as the energy source. The laser 100 emits a laser beam 101 which passes through a partially reflective mirror 102 and enters a scanning and focusing system 103 which then projects the beam to a small region, beam interaction region 104, on a work platform 105. In some embodiments, the work platform includes a powder bed. Optical energy 106 is emitted from the beam interaction region 104 on account of high material temperatures.

In some embodiments, the scanning and focusing system 103 can be configured to collect some of the optical energy 106 emitted from the beam interaction region 104. The partially reflective mirror 102 can reflect the optical energy 106 as depicted by optical signal 107. The optical signal 107 may be interrogated by multiple optical sensors 109 each receiving a portion of the optical signal 107 through a series of additional partially reflective mirrors 108. It should be noted that in some embodiments, the additive manufacturing system could only include one optical sensor 109 with a fully reflective mirror 108.

It should be noted that the collected optical signal 107 may not have the same spectral content as the optical energy 106 emitted from the beam interaction region 104 because the signal 107 has suffered some attenuation after going through multiple optical elements such as 103, 102, and 108. These optical elements may each have their own transmission and absorption characteristics resulting in varying amounts of attenuation that thus limit certain portions of the spectrum of energy radiated from the beam interaction region 104. The data generated by the optical sensors 109 may correspond to an amount of energy imparted on the work platform.

Examples of optical sensors 109 include but are not limited to photo to electrical signal transducers such as pyrometers and photodiodes. The optical sensors can also include spectrometers, and low or high speed cameras that operate in the visible, ultraviolet, or the infrared frequency spectrum. The sensors 109 are in a frame of reference which moves with the beam, i.e., they see all regions that are touched by the laser beam and are able to collect optical signals 107 from all regions of the work platform 105 touched by the laser beam 101. Because the optical energy 106 collected by the scanning and focusing system 103 travels a path that is near parallel to the laser beam, sensors 109 can be considered on-axis sensors.

In some embodiments, the additive manufacturing system can include a first stationary sensor 110 and a second stationary sensor 124 that are in a stationary frame of reference with respect to the laser beam 101. Stationary sensors can be considered Eulerian sensors. The first stationary sensor 110 can have a given first field of view 111 which could be very narrow and cover only a portion of the work platform 105. The second stationary sensor 124 can have a given second field of view 126 which could encompass a wider area than the first field of view 111. The second field of view 126 can encompass an area up to the entire work platform 105.

Examples of the first stationary sensor 110 and the second stationary sensor 124 can include but are not limited to pyrometers, photodiodes, spectrometers, high or low speed cameras operating in visible, ultraviolet, or IR spectral ranges, etc. In some embodiments the sensors can be temperature sensors, processing raw voltage or current data and outputting temperature data. The first stationary sensor 110 and the second stationary sensor 124 are not aligned with the energy source and can be considered off-axis sensors. In some embodiments, the second stationary sensor 124 having the second field of view 126 can be configured to detect temperature changes in substantially any portion of the top surface of work platform 105. In some embodiments, the first stationary sensor 110 can be configured to provide calibration information to the second stationary sensor 124, thereby allowing the second stationary sensor 124 to accurately distinguish the temperature of any point on the top surface of the work platform 105. Additional description related to sensor calibration is provided in U.S. patent application Ser. No. 14/945,247, filed on Nov. 18, 2015, the disclosure of which is hereby incorporated by reference in its entirety for all purposes.

The sensors could also be sensors which combine a series of physical measurement modalities such as a laser ultrasonic sensor which could actively excite or "ping" the deposit with one laser beam and then use a laser interferometer to measure the resultant ultrasonic waves or "ringing" of the structure in order to measure or predict mechanical properties or mechanical integrity of the deposit as it is being built. The laser ultrasonic sensor/interferometer system can be used to measure the elastic properties of the material, which can provide insight into, for example, the porosity of the material and other materials properties. Additionally, defect formation that results in material vibration can be measured using the laser ultrasonic/sensor interferometer system. In some embodiments, the HPBW can be determined using a monitored temperature generated from pyrometer data collected by the first stationary sensor 110 and the second stationary sensor 124.

Additionally, there could be contact sensors 113 on the mechanical device, recoater arm 112, which spreads the powders. These sensors could be accelerometers, vibration sensors, etc. Lastly, there could be other types of sensors 114. These could include contact sensors such as thermocouples to measure macro thermal fields or could include acoustic emission sensors which could detect cracking and other metallurgical phenomena occurring in the deposit as it is being built. These contact sensors can be utilized during the powder addition process to characterize the operation of the recoater arm 112. Data collected by the optical sensors 109 and the stationary sensors 110 can be used to detect process parameters associated with the recoater arm 112. Accordingly, non-uniformities in the surface of the spread powder can be detected and addressed by the system. Rough surfaces resulting from variations in the powder spreading process can be characterized by contact sensors 113 in order to anticipate possible problem areas or non-uniformities in the resulting part.

In some embodiments, a peak in the powder spread can be fused by the laser beam 101, resulting in the subsequent layer of powder having a corresponding peak. At some point, the peak could contact the recoater arm 112, potentially damaging the recoater arm 112 and resulting in additional spread powder non-uniformity. Accordingly, embodiments of the present invention can detect the non-uniformities in the spread powder before they result in non-uniformities in the build area on the work platform 105. One of ordinary skill would recognize many variations, modifications, and alternatives.

In some embodiments, the optical sensors 109, stationary sensors 110, contact sensors 113, and other sensors 114 can be configured to generate in-process raw sensor data. In other embodiments, the optical sensors 109, stationary sensors 110, contact sensors 113, and other sensors 114 can be configured to process the data and generate reduced order sensor data.

In some embodiments, a computer 116, including a processor 118, computer readable medium 120, and an I/O interface 122, is provided and coupled to suitable system components of the additive manufacturing system in order to collect data from the various sensors. Data received by the computer 116 can include in-process raw sensor data and/or reduced order sensor data. The processor 118 can use in-process raw sensor data and/or reduced order sensor data to determine laser 100 power and control information, including coordinates in relation to the work platform 105. In other embodiments, the computer 116, including the processor 118, computer readable medium 120, and an I/O interface 122, can provide for control of the various system components. The computer 116 can send, receive, and monitor control information associated with the laser 100, the work platform 105, and the recoater arm 112 in order to control and adjust the respective process parameters for each component.

The processor 118 can be used to perform calculations using the data collected by the various sensors to generate in process quality metrics. In some embodiments, data generated by the stationary sensors 110 can be used to determine the HPBW during the build process. Control information associated with movement of the heat source across the build plane can be received by the processor. The processor can then use the control information to correlate data from stationary sensors 110 with a corresponding location of the heat source. This correlated data can then be combined with the HPBW to determine changes in process parameters. In some embodiments, the HPBW and/or other metrics can be used by the processor 118 to generate control signals for process parameters, for example, laser power, laser speed, hatch spacing, and other process parameters in response to the HPBW or other metrics falling outside of desired ranges. In this way, a problem that might otherwise ruin a production part can be ameliorated. In embodiments where multiple parts are being generated at once, prompt corrections to the process parameters in response to metrics falling outside desired ranges can prevent adjacent parts from receiving too much or too little energy from the heat source.

In some embodiments, the I/O interface 122 can be configured to transmit data collected to a remote location. The I/O interface can be configured to receive data from a remote location. The data received can include baseline datasets, historical data, post-process inspection data, and classifier data. The remote computing system can calculate in-process quality metrics using the data transmitted by the additive manufacturing system. The remote computing system can transmit information to the I/O interface 122 in response to particular in-process quality metrics.

Figure 1B:
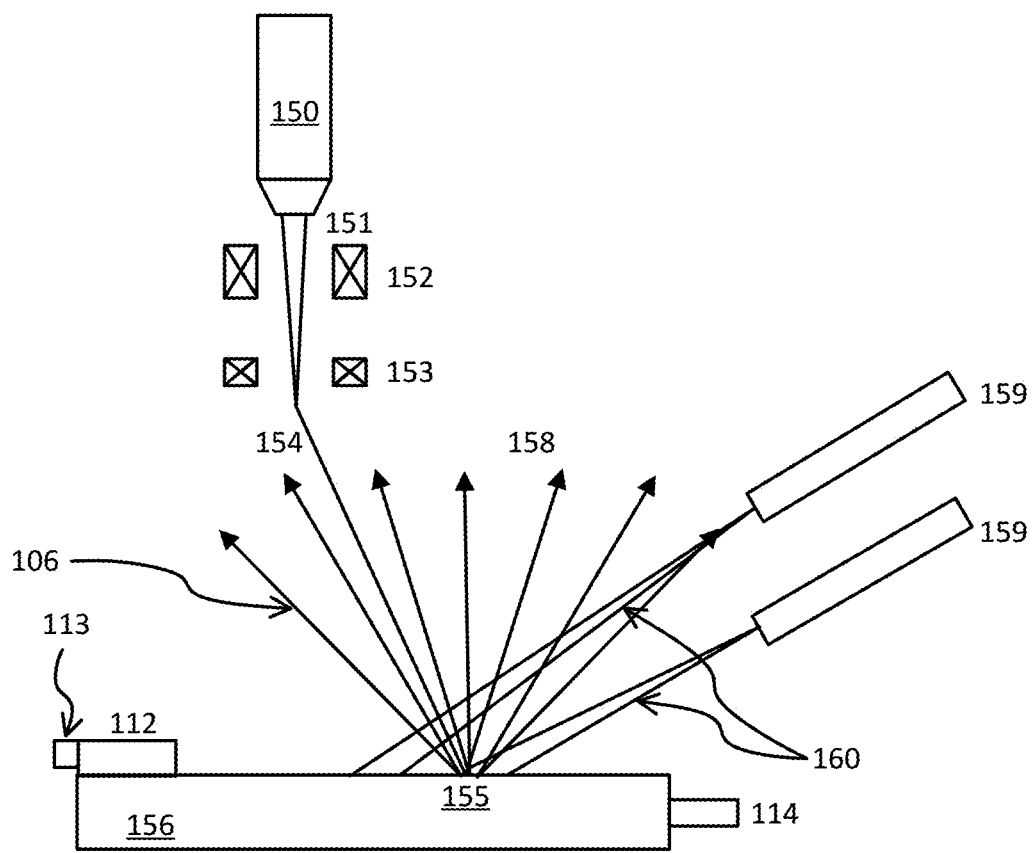
FIG. 1B is a schematic illustration of a system with an intense heat source, in this specific instance taken to be an electron beam.

In the case of an electron beam system, FIG. 1B shows possible configurations and arrangements of sensors. The electron beam gun 150 generates an electron beam 151 that is focused by the electromagnetic focusing system 152 and is then deflected by the electromagnetic deflection system 153 resulting in a finely focused and targeted electron beam 154. The electron beam 154 creates a hot beam-material interaction zone 155 on the workpiece 156. Optical energy 158 is emitted which could be collected by a series of sensors 159, each with their own respective field of view 160 which, again, could be locally isolated to the interaction region 155 or could encompass the entire workpiece 156. Additionally, the sensors 159 could have their own tracking and scanning system which could follow the electron beam 154 as it moves across the workpiece 156.

Whether or not sensors 159 have optical tracking, the sensors 159 could consist of pyrometers, photodiodes, spectrometers, and high or low speed cameras operating in the visible, UV, or IR spectral regions. The sensors 159 could also be sensors which combine a series of physical measurement modalities such as a laser ultrasonic sensor which could actively excite or "ping" the deposit with one laser beam and then use a laser interferometer to measure the resultant ultrasonic waves or "ringing" of the structure in order to measure or predict mechanical properties or mechanical integrity of the deposit as it is being built. Additionally, there could be contact sensors 113 on the recoater arm. These sensors could be accelerometers, vibration sensors, etc. Lastly, there could be other types of sensors 114. These could include contact sensors such as thermocouples to measure macro thermal fields or could include acoustic emission sensors which could detect cracking and other metallurgical phenomena occurring in the deposit as it is being built. In some embodiments, one or more thermocouples could be used to calibrate temperature data gathered by sensors 159. It should be noted that the sensors described in conjunction with FIGS. 1A and 1B can be used in the described ways to characterize performance of any additive manufacturing process involving sequential material build up.

Figure 2A:
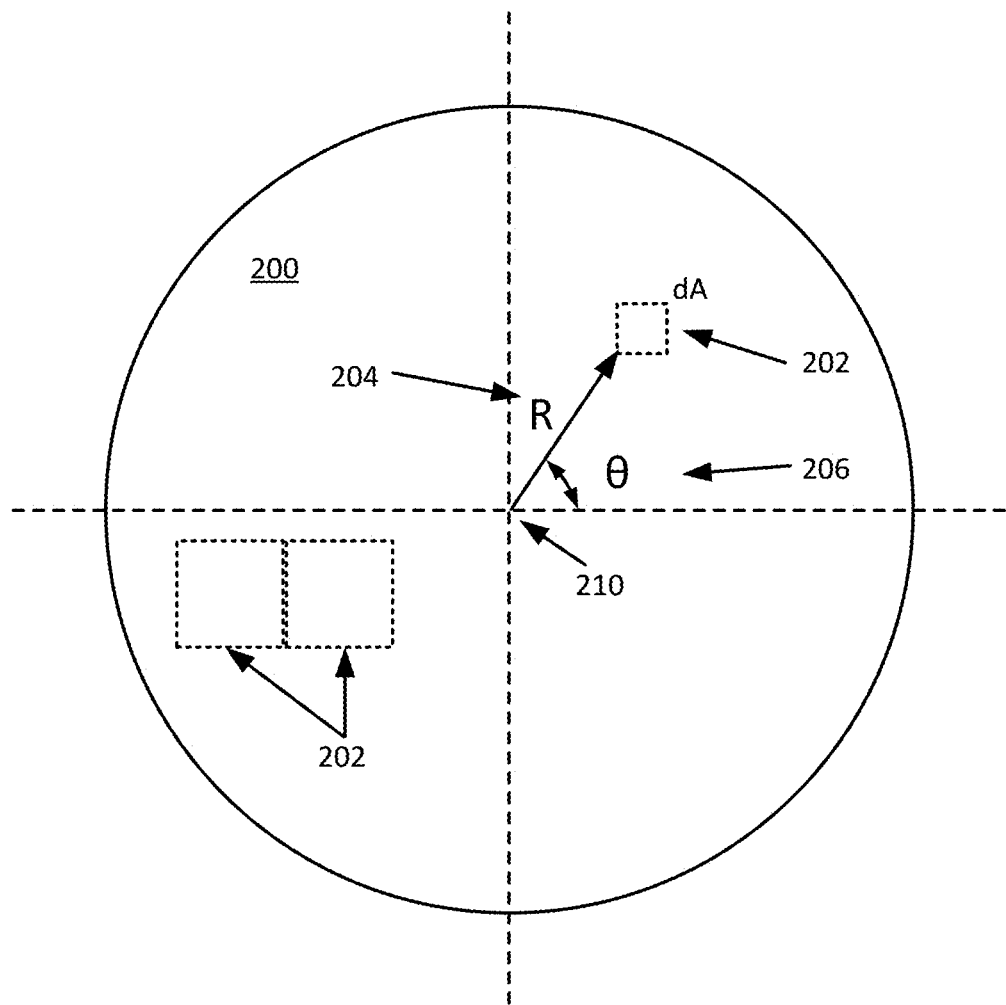
FIG. 2A shows an exemplary field of view of a pyrometer setup as a Eulerian sensor.

FIG. 2A shows an exemplary field of view of a pyrometer setup as a Eulerian sensor. The first stationary sensor 110 and the second stationary sensor 126 can be pyrometers configured as Eulerian sensors. A Eulerian sensor is based on a Eulerian frame of reference. A Eulerian frame of reference specifies quantities associated with any transport phenomenon by looking at values associated with specific points in space at given intervals in time. Therefore the point grid in space is fixed, and the medium "flows" through this grid. This is analogous to sitting on a riverbank and watching the river go by. In some embodiments, the Eulerian frame of reference is a stationary frame of reference that the energy beam passes through.

In FIG. 2A, the Eulerian frame of reference is indicated by a circular field of view 200. The temperature field within a field of view 200 can be variable and can be a function of location as well as time. Each individual area element 202 will contribute to the overall averaged temperature that is observed in proportion to its area as a fraction of the total area of the pyrometer field of view. The small differential area element 202 is schematically indicated in FIG. 2A. The field of view 200 may include a multitude of area elements 202 that are radiating. A region of the build plane covered by the differential area element 202 may be associated with a time interval when the scan passes through the region. In general these areas are dispersed at a given radius, R, 204 from the center 210 and at a certain angular orientation, θ, 206 within the field of view 200 of the pyrometer. Furthermore, each individual area 202 may have a different emissivity that is a function of temperature.

Figure 2B:
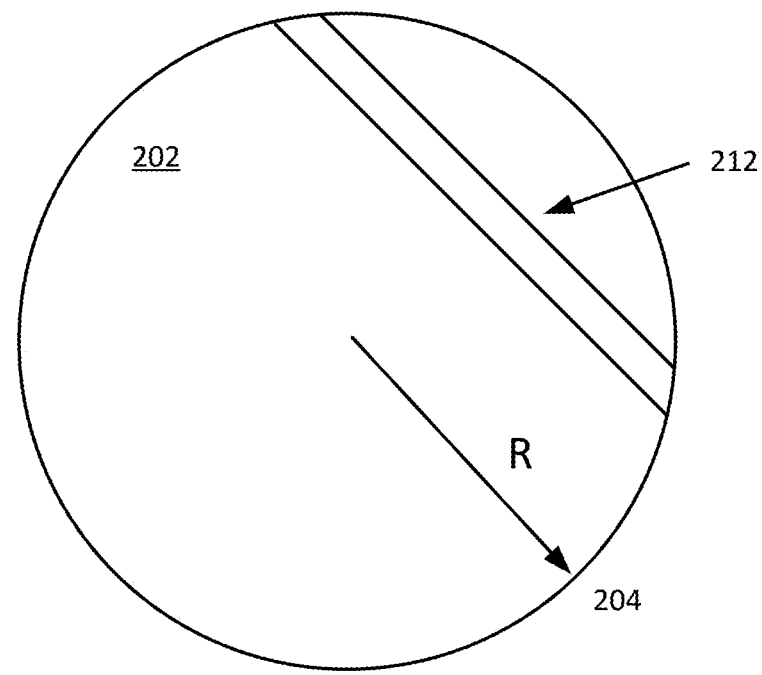
FIG. 2B schematically shows the field of view of the pyrometer and the track of thermally affected and melted material caused by the moving heat source.

FIG. 2B schematically shows the field of view 200 of the pyrometer and the tract 212 of thermally affected and melted material caused by the moving heat source. The field of view 200 of the pyrometer is shown as a circular field of view with a radius, R, 204. The region that is heated and melted by the moving heat source is shown as a rectangular tract 212, which intersects the pyrometer field of view 200. Generally, this tract will vary in size, area and location where it intersects the field of view.

Figure 2C:
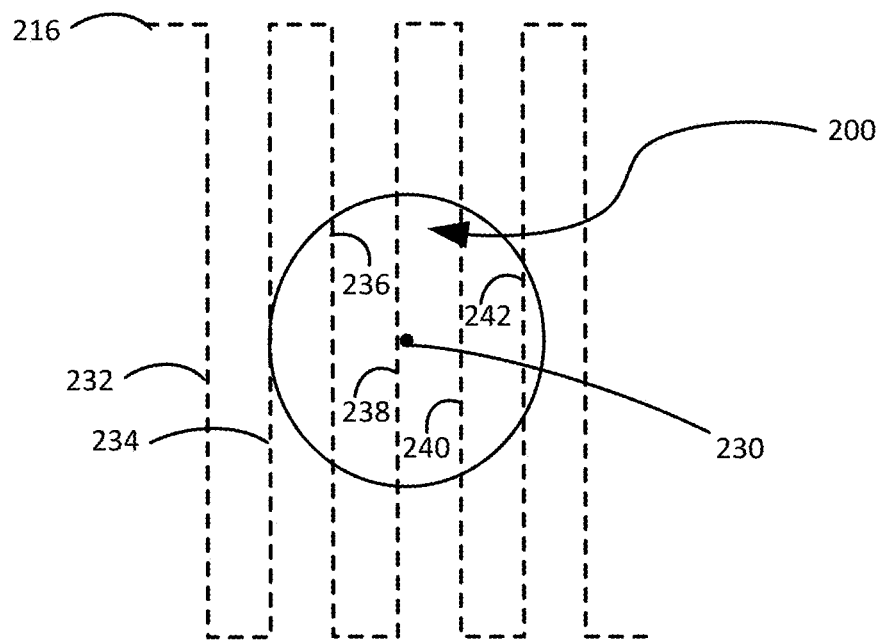
FIG. 2C shows an exemplary scan pattern that can be traversed by a heat source.

The heat source is not an instantaneous heat source, i.e. it is not instantly turning on and releasing a finite amount of heat instantaneously. Rather, the heat source is a moving, continuous heat source. Different areas within the field of view are constantly increasing and decreasing in temperature as the heat source is moving through the field of view sweeping out the heated areas. The heated areas correspond to the tract 212 of the thermally affected material. Therefore, the observed temperature can be interpreted as a time-integrated average of the time-dependent thermal behavior of the hot and cold regions—each weighted by their area fractions. FIG. 2C shows an exemplary scan pattern 216 that can be traversed by a heat source. As depicted, field of view 200 can represent a relatively small portion of scan pattern 216 and consequently, can only accurately quantify heating and cooling occurring within field of view 200. It should be noted that other scan patterns are possible and can include tighter or looser scan patterns performed at various speeds with various power outputs. The scan rate, power and scan pattern all have an effect upon how much energy gets delivered during the additive manufacturing operation.

Figure 2D:
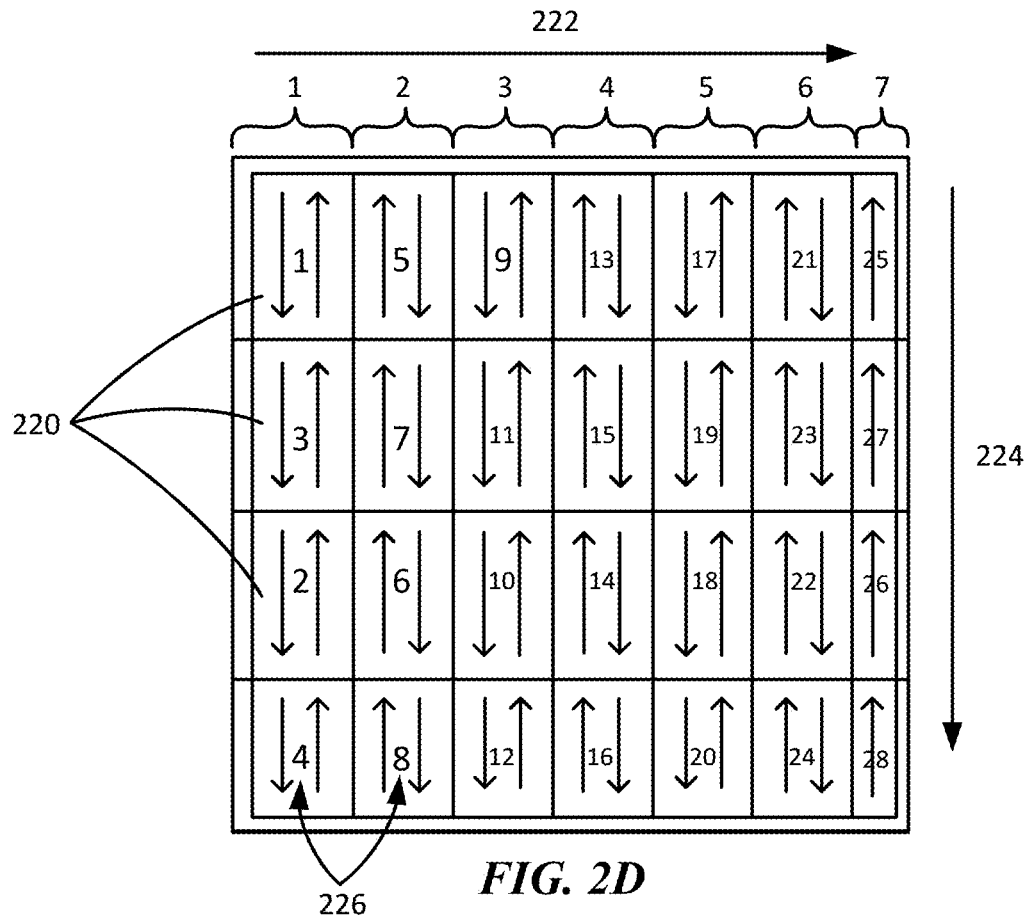
FIGS. 2D-2E show various alternative scan patterns.
Figure 2E:
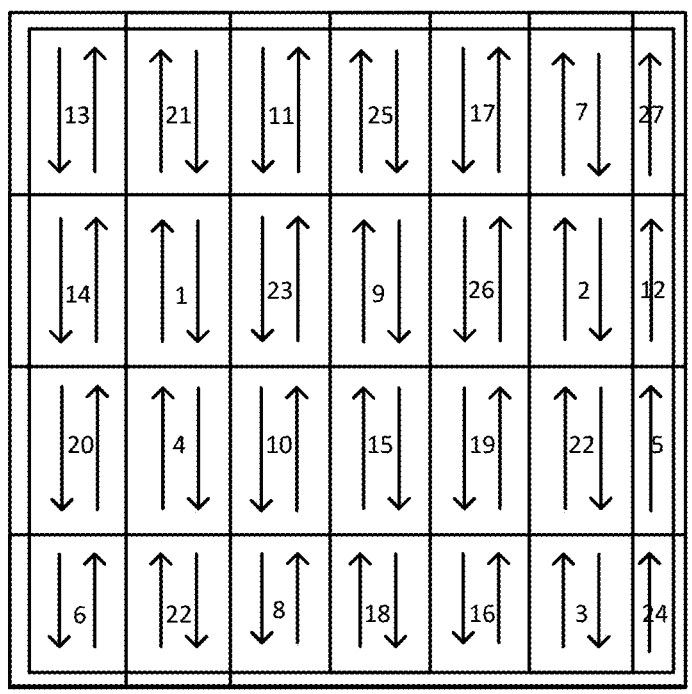

FIGS. 2D-2E show various alternative scan patterns. FIG. 2D shows how the scan pattern can be broken into smaller checkerboards 220 which are scanned sequentially left to right 222 and top to bottom 224. The numbers 226 in each checkerboard 220 indicate the order in which each checkerboard 220 is scanned. In FIG. 2E, the same checkboard pattern is shown, but now the scan order for the individual checkerboards 220 is randomized. Irrespective of the specific scanning pattern or scanning strategy involved, it is seen that the laser based process can involve short, discrete scan lengths with a start and a stop and a path length.

If a scan pattern similar to the ones depicted in FIG. 2D or 2E were being monitored by a Eulerian photodiode such as the first stationary sensor 110 (see FIG. 1A), the data coming back to the photodiode would have many individual signals each representing a given specific scan over a specific path length. In some embodiments, the individual signals can be separated out according to their path length. The apparent intensity of the signal as observed by the photodiode will be a function of this path length. This is because at the start of the scan, the photodiode intensity is zero or very small because the laser has just turned on. As the scan proceeds, the scan generally heats a portion of the powder bed and the heated portion becomes a region of molten metal that emits more energy as light. In response to the energy emitted by the region of molten metal, the intensity measured by the photodiode would increase. Referring again to FIG. 2C, the intensity generally reaches a maximum value when the energy source tracing along the scan pattern 216 is within the field of view 200. The highest temperature can generally be associated with the scan with the longest dwell time in field of view 200 such as scan 238 in FIG. 2C. In other embodiments a change in the beam power or beam travel speed can cause the highest temperature to be associated with a scan with a shorter dwell time. In some embodiments there can be a natural range and scatter in the photodiode raw signal as the light intensity varies throughout the process due to the very chaotic nature of several physical processes. For example, the laser energy source/powder interactions, the chaotic motion of the molten metal, the changing view factor from this small hot spot to the photodiode, and the solidifying of the powder bed after the energy source passes along the scan pattern 216.

An observed temperature can be calculated using sensor data generated by the stationary sensors and/or on-axis senators. In some embodiments, the stationary sensor can be a pyrometer having a field of view that is substantially larger than the region that is hot. The substantially larger field of view can result in the observed temperature of the heated region differing from a true temperature of the heated region and/or weld pool in the field of view. In some embodiments, the various sensors described in relation to FIGS. 1A and 1B can be used to normalize the observed temperature to a true temperature. Additional description related to determining a true temperature is provided in U.S. patent application Ser. No. 14/945,247, filed on Nov. 18, 2015, the disclosure of which is hereby incorporated by reference in its entirety for all purposes.

Figure 3A:
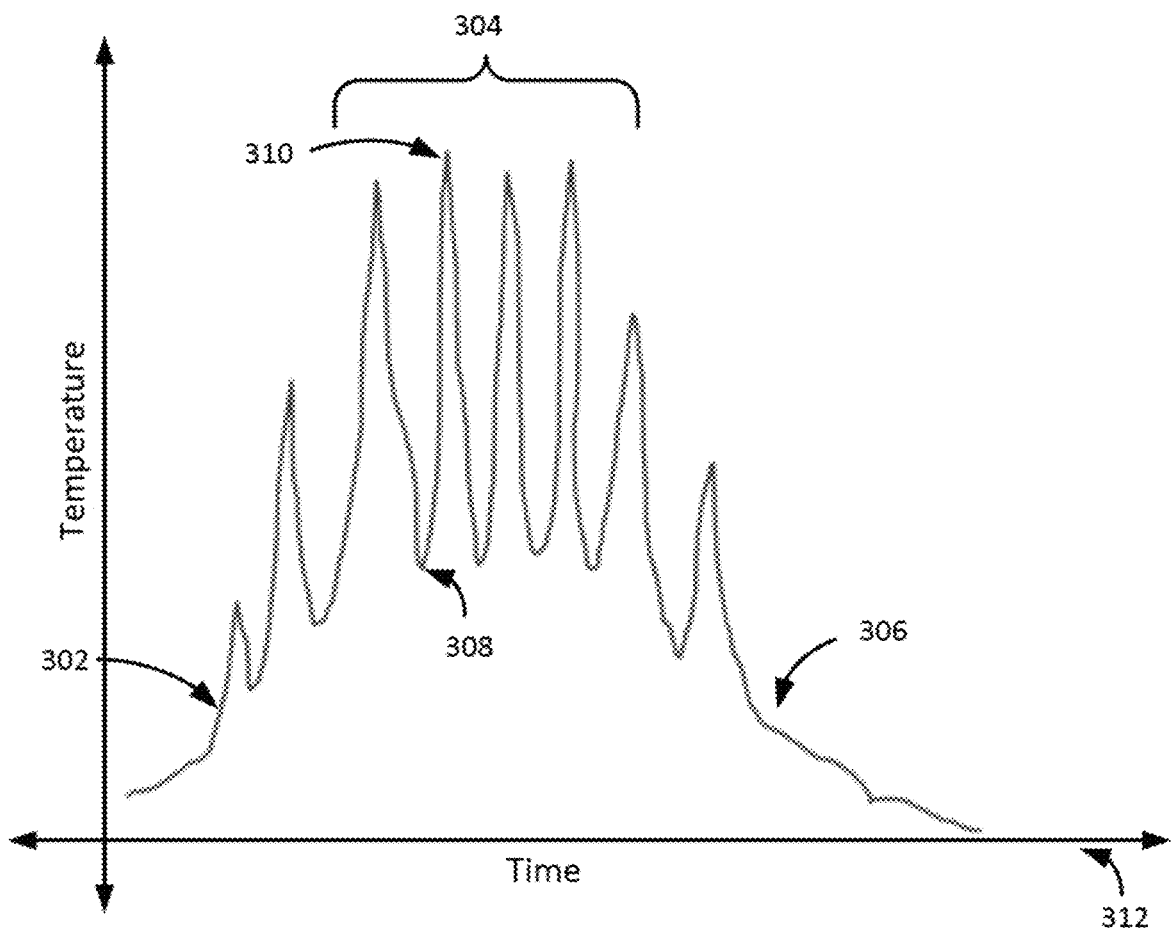
FIG. 3A shows the raw data from a fixed (Eulerian) pyrometer as multiple scans of a heat source pass through the field of view.

FIG. 3A shows an exemplary signal profile measured by a pyrometer according to embodiments of the present invention. The signal profile represents the raw temperature data from a fixed field of view (Eulerian) pyrometer as multiple scans of a heat source pass through the field of view 200. As the moving heat source moves closer to the field of view of the thermal sensor, there is a rise in the background temperature 302. The rise in the background temperature 302 can correspond to scans such as 232 or 234, shown in FIG. 2C, which pass close to, but do not enter, the field of view 200. Eventually the moving heat source is fully within the field of view 200, and there are higher temperature, rapid thermal excursions 304. The rapid thermal excursions 304 can correspond to scans such as 236, 238, 240, 242, shown in FIG. 2C, which pass within the field of view 200. As the heat source then fades from the field of view and moves to other regions of the material, there will be a slower falling thermal transient 306. The transients in FIG. 3A will have phase changes associated with them as well, but this is only visible or discernable at closer inspection of the more rapid, higher temperature thermal transients 304.

The profile in FIG. 3A results because the field of view 200 of the pyrometer the heat source is scanning through is circular. For example, during one scan the heat source enters the field of view 200 at or near a first point 308. As the heat source approaches the center of the field of view, the track length of heated material within the field of view grows larger and the temperature data output by the pyrometer responds accordingly. The temperature continues to increase as the heat source passes through the field of view and attains a maximum 310 while the heat source is within the field of view 200. The maximum 310 generally occurs at or near a point in time, represented by the x-axis 312, that corresponds to the heat source exiting field of view 200 after passing through a central portion of field of view 200 (e.g., see scan 238 as depicted in FIG. 2C). As the scanning beam exits the field of view 200 the thermal signature again decreases in magnitude.

Figure 3B:
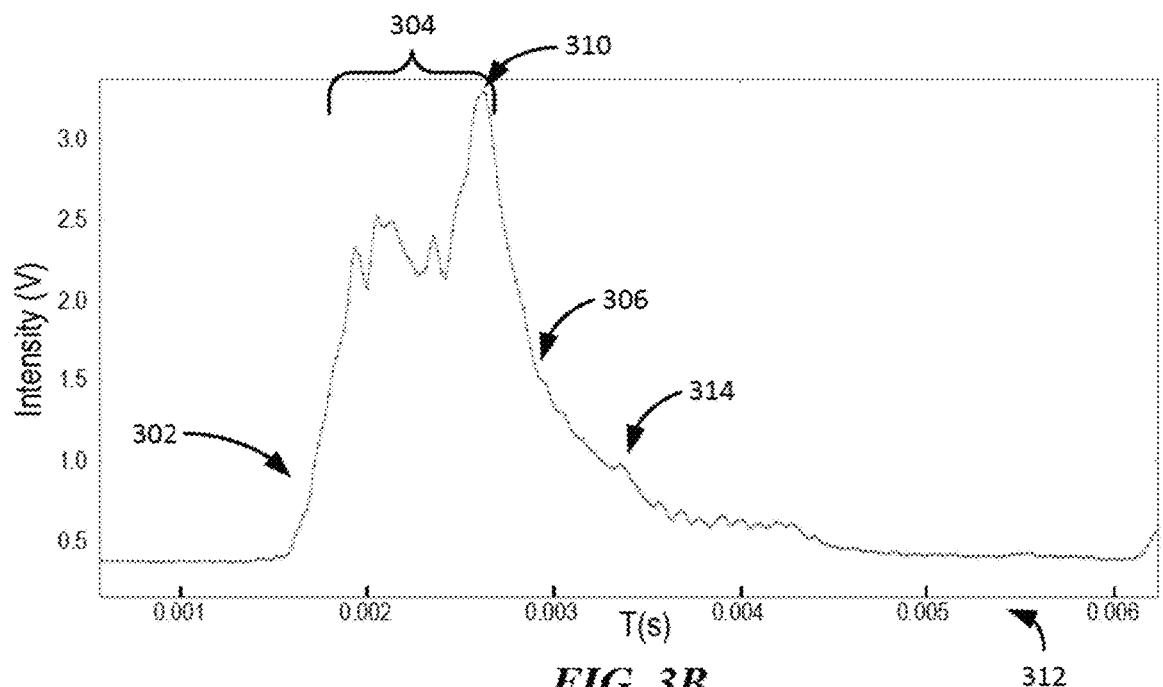
FIG. 3B shows the test results from a fixed (Eulerian) photodiode as multiple scans of a heat source pass through the field of view.
Figure 3C:
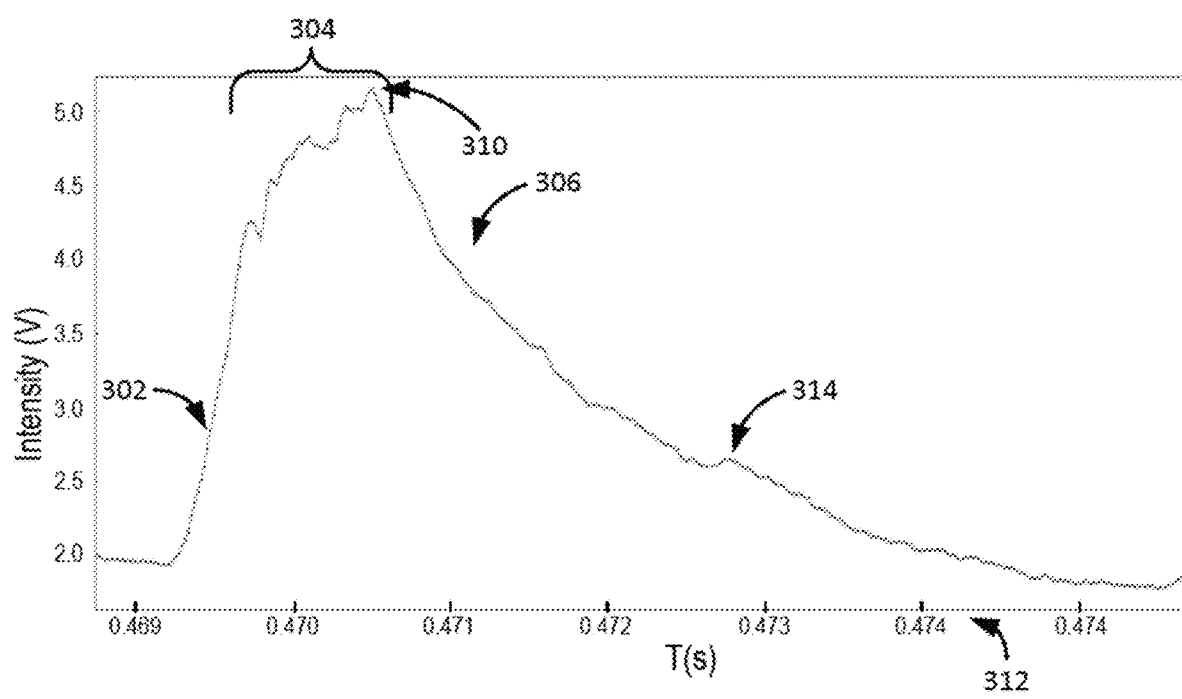
FIG. 3C shows the test results from a fixed (Eulerian) pyrometer as multiple scans of a heat source pass through the field of view.

FIGS. 3B and 3C show the temperature profile measured by a photodiode and a pyrometer respectively as the heat source makes a single scan through the respective sensor field of view. The temperature profile measured by both sensors show the rise in the background temperature 302 that corresponds to the energy source following the scan pattern close to the field of view. The rapid thermal excursions are present in both temperature profiles. A difference in each sensors' physical properties leads to the variation in the magnitude of the individual excursions. The maximum 310 is attained at relatively the same time represented by the x-axis 312. Also, both temperature profiles show the slower falling thermal transient 306 as the heat source moves further away from the field of view. Finally, both temperature profiles show a thermal arrest or inversion 314, which is associated with a phase change in the material, which in the case of the on-cooling curve would be the liquid to solid transition.

Figure 4:
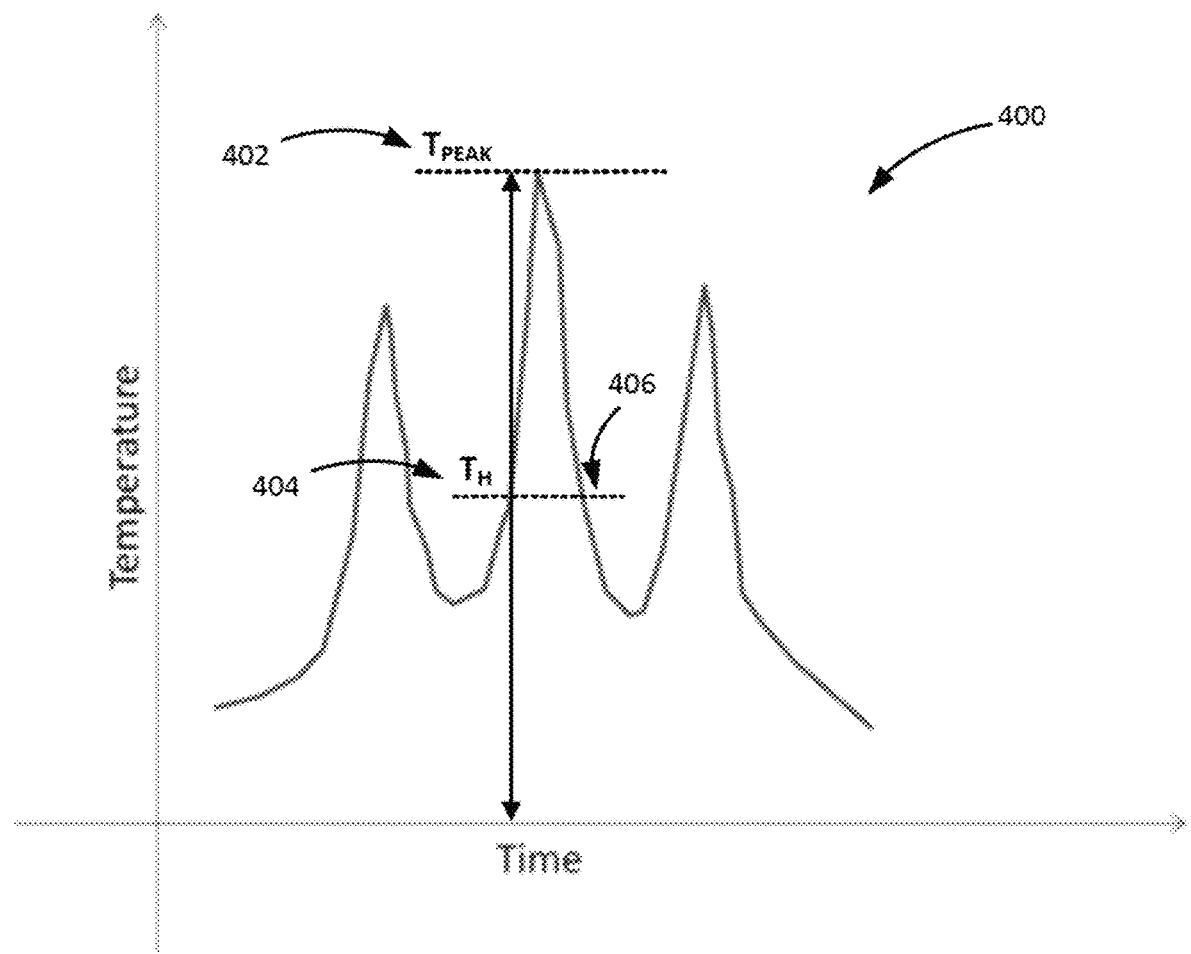
FIG. 4 shows a subset of the temperature profile generated by a fixed pyrometer and associated in process quality metrics.

FIG. 4 is an expanded view of the temperature profile 400 around the maximum 310 illustrated in FIG. 3. FIG. 4 shows TPEAK is the peak temperature 402. In some embodiments a threshold temperature TH 404 can be half of the peak temperature. The threshold temperature 404 is illustrated by line 406 intersecting the temperature profile 400. In other embodiments, the threshold temperature is different than half of the peak temperature and can be determined by dividing TPEAK by e as shown below in Eq. (1):

$$T_H = \frac{T_{PEAK}}{e} \qquad \text{Eq. (1)}$$

Where e is the Euler Number: e≈2.71828. In other embodiments, the denominator e, could be replaced with a predetermined amount to reduce the peak temperature to the threshold temperature 404. For example, desired process parameters, other IPQMs, and peak temperature data can be analyzed using machine learning or statistical techniques to identify an ideal threshold temperature 404.

In alternative embodiments of the present invention threshold temperature 404 can be changed to accommodate certain types of additive manufacturing operations. For example, high-power usage operations can utilize a half power bandwidth that accommodates a higher energy and/or faster heat source travel speed. In other embodiments, the half power bandwidth can be adjusted in accordance with the requirements of a specific additive manufacturing operation.

Figure 5:
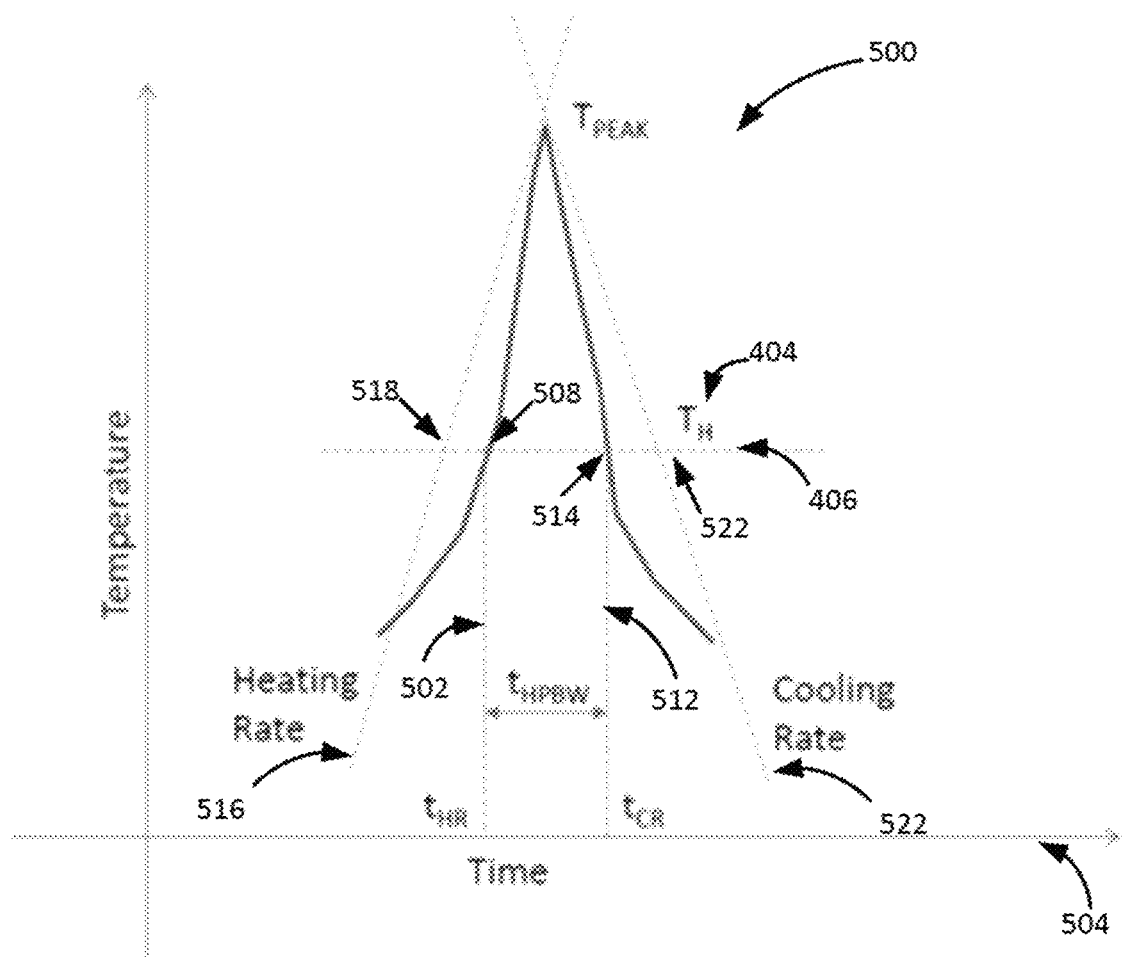
FIG. 5 shows a peak temperature profile from the fixed pyrometer and the parameters used to determine a half power bandwidth.

FIG. 5 illustrates a temperature profile 500 for an individual peak temperature such as the peak temperature 402 shown in FIG. 4. The x-axis 504 represents the time. Line 406 intersects the temperature profile at the threshold temperature 404. FIG. 5 illustrates two times at which the line 406 representing the threshold temperature intersects the temperature profile 500. A first time, $t_{HR}$, is associated with the heating rate. The first time, $t_{HR}$, is illustrated by line 502, which extends from the intersection 508 of the threshold temperature line 406 and the temperature profile 500 to the x-axis 504. A second time, $t_{CR}$ is associated with the cooling rate. The second time, $t_{CR}$, is illustrated by line 512 that extends from the second intersection 514 of the threshold temperature line 406 and the temperature profile 500 to the x-axis 504. In some embodiments, a metric can be calculated using $t_{HR}$ and $t_{CR}$. According to embodiments of the present invention, the metric can be defined as the HALF POWER BANDWIDTH, $t_{HPBW}$, and it is given by Eq. (2):

$$t_{HPBW}=(t_{CR}-t_{HR}) \qquad \text{Eq. (2)}$$

In some embodiments, in addition to the threshold temperature, fit lines representing the heating and cooling rates can be determined. In some embodiments the fit lines can be calculated using a subset of data points from the temperature profile 500. The subset can be determined using, for example, a threshold minimum and maximum temperatures or threshold times that correspond to a predetermined position of the heat source along the scan pattern. The fit lines can be determined using a simple process of connecting the minimum and maximum temperatures. In some embodiments, a more precise method for determining the best fit line such as the least squares method may use all of the selected data points from the temperature profile 500 to determine a fit line. One of ordinary skill in the art would recognize many variations, modifications, and alternatives.

FIG. 5 also illustrates a heating rate fit line 516 and a cooling rate fit line 522. The heating rate fit line 516 can be used to determine the first time associated with the heating rate, $t_{HR}$. The time associated with the heating rate can be calculated based on the first fit line intersection 518 of the heating rate fit line 516 and the threshold temperature 404. The cooling rate fit line 522 can be used to determine the second time associated with the cooling rate, $t_{CR}$. The time associated with the cooling rate can be calculated based on the second fit line intersection 522 of the cooling rate line 522 and the threshold temperature 404. The half power bandwidth, $t_{HPBW}$, can be calculated using the relationship provided above. In some embodiments the use of a fit line versus the temperature profile 500 may result in a different half power bandwidth, $t_{HPBW}$, but consistent use of either model should provide a metric that indicates changes in process parameters that affect the quality of a finished part.

The half power bandwidth can be used to predict, measure, and control process parameters in the additive manufacturing process. Process parameters include, for example, beam power, beam travel speed, hatch spacing, etc. To illustrate, an increase in $t_{HPBW}$ can indicate that beam power has increased. For example, when the beam power increases, the peak temperature increases and, as a result, the rise time and fall time to reach the peak temperature increases. Accordingly, the associated width of the thermal profile will broaden because it takes longer for the powder bed to reach the peak higher peak temperature and longer to cool from the higher peak temperature.

In other embodiments, changes in $t_{HPBW}$ can indicate changes in beam travel speed. For example, if beam travel speed is increased, $t_{HPBW}$ will go down because the associated thermal cycles are faster causing the overall heat intensity in J/mm to decrease. As a result of the decrease, the thermal profile will shrink in width. Additionally, $t_{HPBW}$ can indicate changes in hatch spacing. For example, if hatch spacing goes up, then the $t_{HPBW}$ will go down. As the hatch spacing goes up, the time before the next laser pass comes along will increase, therefore allowing more time for the previous laser pass to cool. In this case the thermal profile will shrink as the surrounding temperature is lower and therefore the cooling rate is faster.

The half power bandwidth, $t_{HPBW}$, can be predictive of important process changes. The process parameters are shown to be the physical basis for variations in the half power bandwidth, $t_{HPBW}$. Because the half power bandwidth, $t_{HPBW}$, responds to variations in the process parameters, the metric can accurately capture the state of the additive manufacturing process. In some embodiments, the half power bandwidth can detect changes in process parameters that lead to defects in the additive manufacturing process. In response, the method can adjust the appropriate process parameter to prevent the formation of defects in the build plane.

Figure 6:
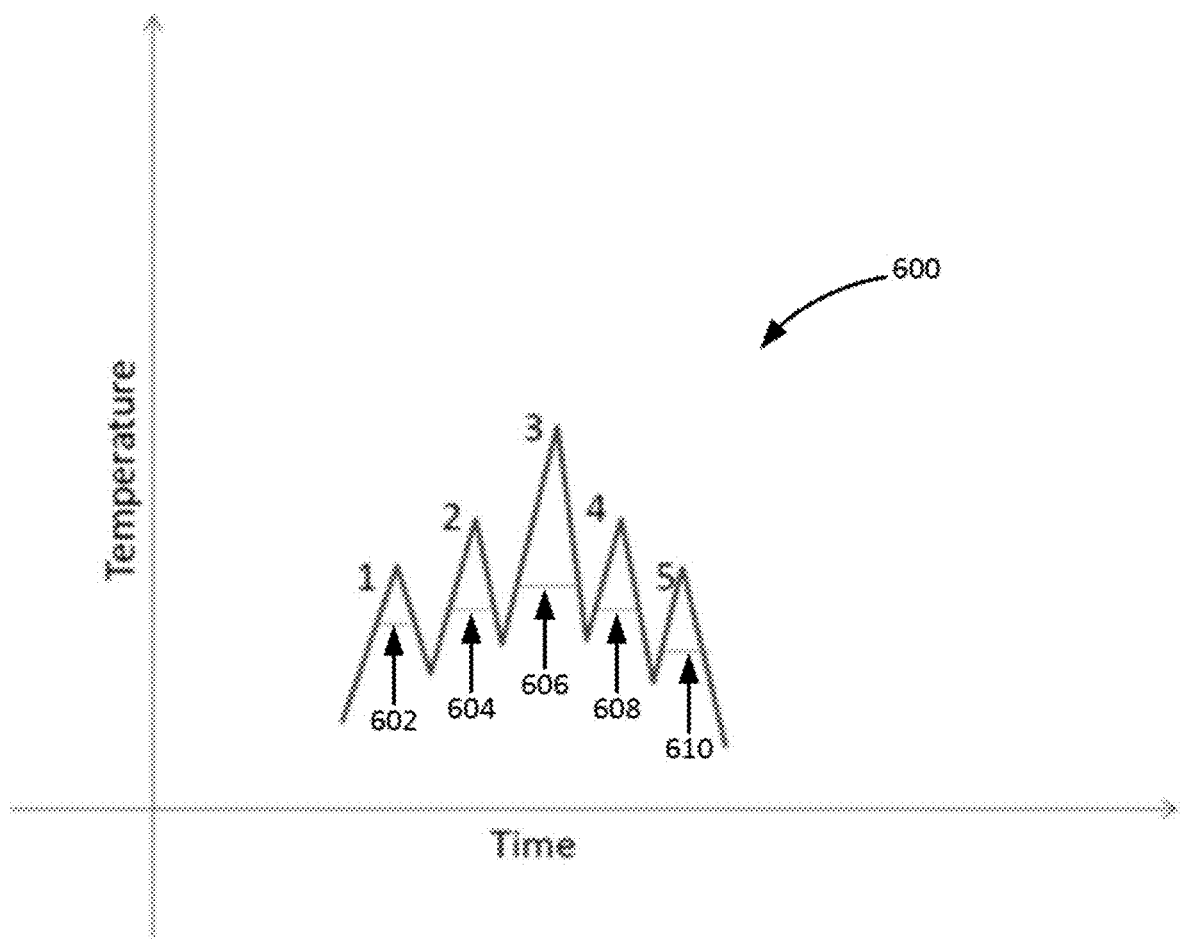
FIG. 6 shows a temperature profile used to calculate an average half power bandwidth using more than one peak temperature.

In some embodiments, thermal profiles associated with more than one scan can be used to determine an in-process quality metric based on the half power bandwidth, $t_{HPBW}$. For example, the total number of peaks associated with the energy source passing directly through the equator of the field of view can be used to determine an average half power bandwidth, $t_{HPBW(avg)}$. FIG. 6 shows an embodiment that uses the average half power bandwidth, $t_{HPBW(avg)}$, to monitor process parameters. The average half power bandwidth can be calculated using a number of peaks, N, centered around a highest peak 3. FIG. 6 illustrates a temperature profile 600 where N=2. In FIG. 6, the half power bandwidth, $t_{HPBW}$, is determined for each peak, 1-5. Peak 1 as a $t_{HPBW}$ illustrated by line 602, peak 2 as a $t_{HPBW}$ illustrated by line 604, peak 3 as a $t_{HPBW}$ illustrated by line 606, peak 4 as a $t_{HPBW}$ illustrated by line 608, and peak 5 as a $t_{HPBW}$ illustrated by line 610. The average of the five peaks can be calculated using Eq. (3):

$$t_{HPBW}(avg) = \frac{t_{HPBW}(1) + t_{HPBW}(2) + t_{HPBW}(3) + t_{HPBW}(4) + t_{HPBW}(5)}{5} \quad \text{Eq. (3)}$$

The average half power bandwidth can also be a meaningful metric with less susceptibility to errors associated with the measurement of a single scan.

Figure 7A:
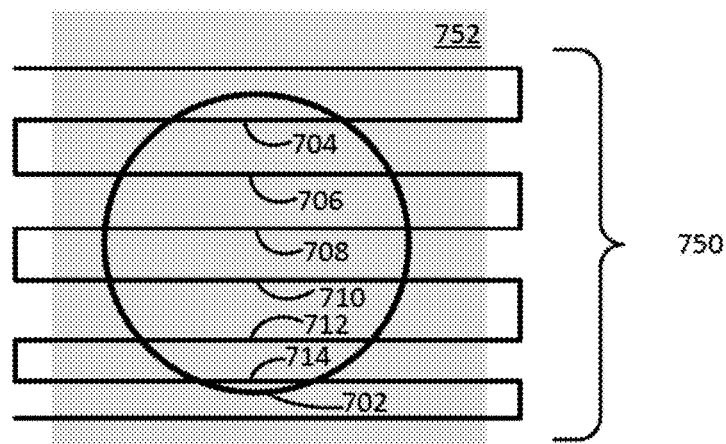
FIG. 7A shows a heat source scan pattern and the portion covered by a field of view of a sensor.
Figure 7B:
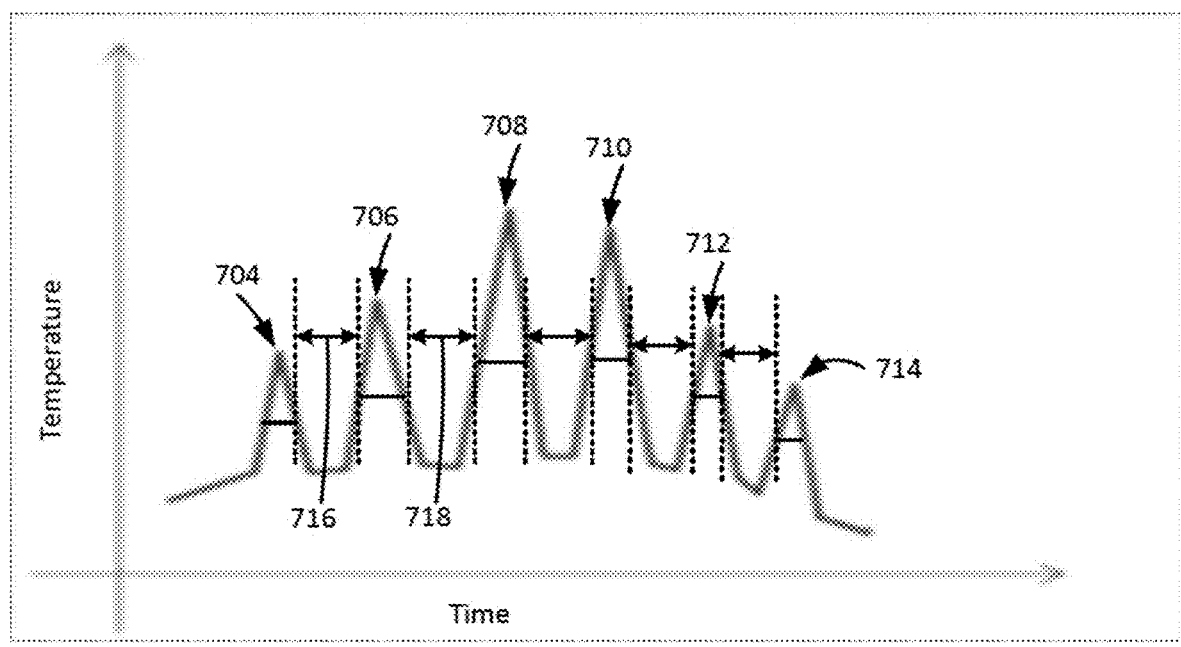
FIG. 7B shows the temperature profile associated with the field of view in FIG. 7A.

In addition to process parameters, the spacing of peaks can be determined based on the half power bandwidth, $t_{HPBW}$. A time interval associated with the spacing of the peaks can be used to determine the relative location of the field of view of the pyrometer with respect to the hatch pattern. The spacing can be used to determine the laser scan pattern and the hatch size. FIGS. 7A and 7B illustrate an embodiment where the field of view is centered in the hatch and the peaks are all approximately equally spaced. FIG. 7A illustrates a heat source scan pattern 750 on a build plane 752. Only a portion of the build plane 752 is covered by a field of view 702 of a sensor. The heat source will travel along the scan pattern 750.

In some embodiments, the heat source can pass through the field of view 702 six times, 704, 706, 708, 710, 712, and 714. Each pass through the field of view will be associated with a peak in FIG. 7B. A half power bandwidth, $t_{HPBW}$, can be determined for each peak. The spacing between each half power bandwidth, $t_{space}$, can be calculated using the cooling rate, $t_{CR}$, and the heating rate, $t_{HR}$ of two adjacent peaks. For example, the first space, $t_{s1}$, 716 can be calculated using $t_{CR}$ associated with peak 704 and $t_{HR}$ associated with peak 706. The second and subsequent spaces can be calculated in a similar manner yielding a sequence of times associated with the space between heat source scans ($t_{s1}$, $t_{s2}$, $t_{s3}$ . . . $t_{sN}$). The field of view is centered in the hatch if $t_{s1} \approx t_{s2} \approx t_{s3} \approx t_{sN}$.

Figure 8A:
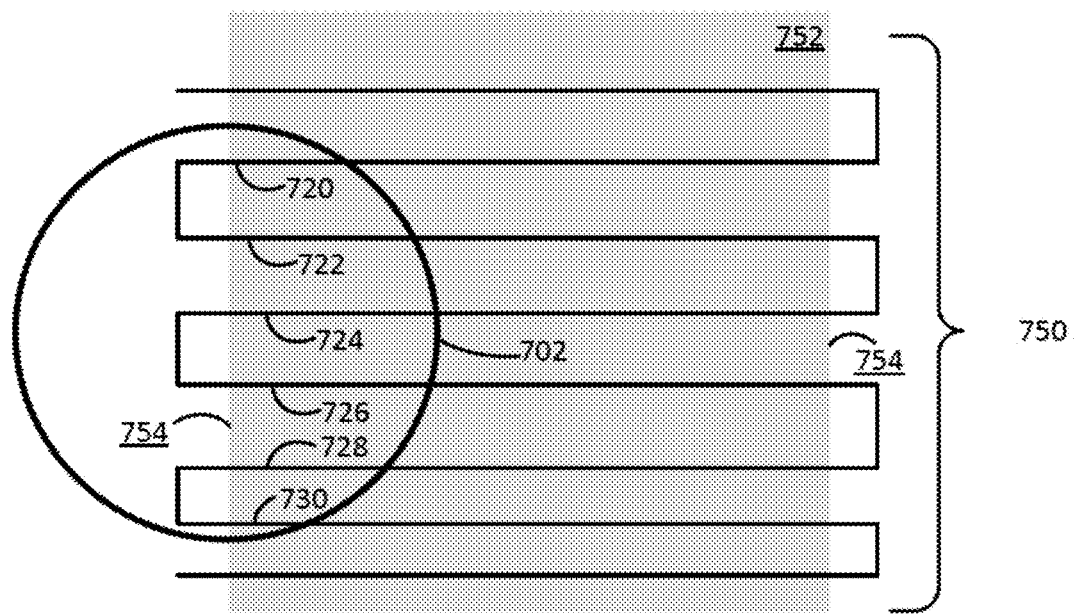
FIG. 8A shows a heat source scan pattern and the portion covered by a field of view of a sensor.
Figure 8B:
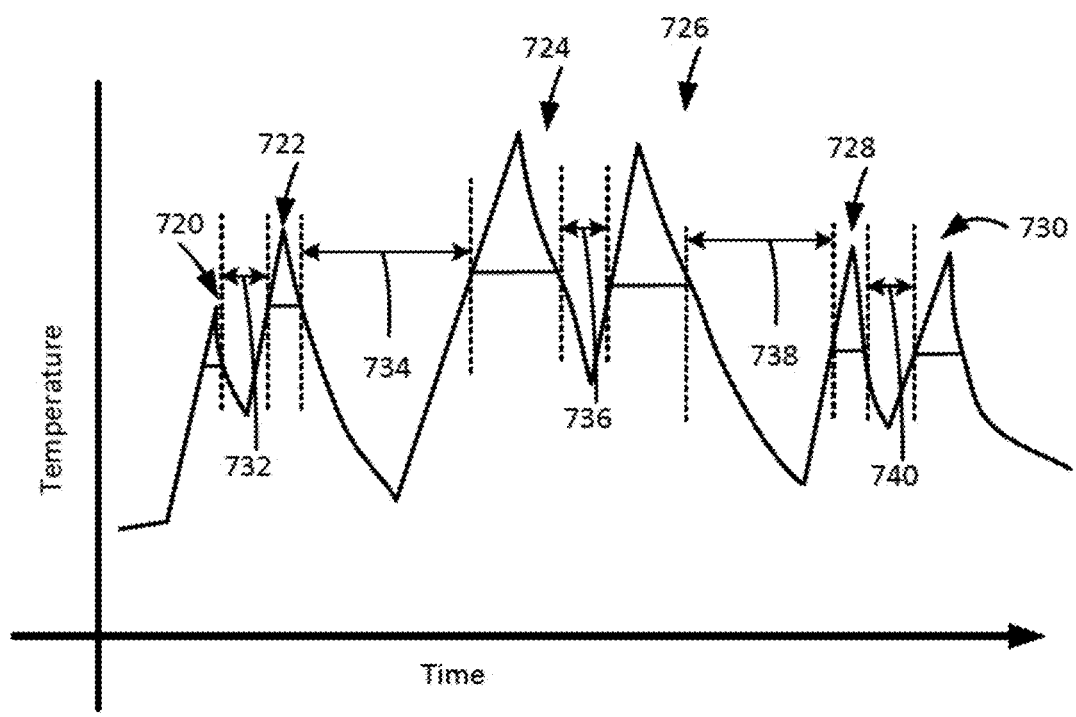
FIG. 8B shows the temperature profile associated with the field of view in FIG. 8A.

FIGS. 3A and 8B illustrate an alternative embodiment where the field of view is not centered in the hatch. FIG. 3A illustrates a heat source scan pattern 750 on a build plane 752. Only a portion of the build plane 752 is covered by the field of view 702 of the sensor. Also, the field of view 702 of the sensor is not centered on the heat source scan pattern 750.

In some embodiments, the heat source can pass through the field of view 702 six times 720, 722, 724, 726, 728, and 730. There are six passes because the heat source will not be emitting energy during the portions of the heat source scan that extend past the boundary 754 of the build plane 752. Each pass through the field of view will be associated with a peak in FIG. 8B. A half power bandwidth, $t_{HPBW}$, can be determined for each peak. The spacing between each half power bandwidth, $t_{space}$, can be calculated using the time associated with the cooling rate, $t_{CR}$, and the time associated with the heating rate, $t_{HR}$ of two adjacent peaks. The times associated with the cooling rate and heating rate are explained in detail with reference to FIG. 5. Referring again to FIG. 8B, the first space, $t_{s1}$, 732 can be calculated using $t_{CR}$ associated with peak 720 and $t_{HR}$ associated with peak 722. The second space, $t_{s2}$, 734 can be calculated in a similar manner but will be measurably larger than $t_{s1}$ due to the time required for the heat source to travel along the heat source scan pattern 750 and return to the field of view. The subsequent spaces can be calculated in a similar manner yielding a sequence of times associated with the space between heat source scans ($t_{s1}$ 732, $t_{s2}$ 734, $t_{s3}$ 736, $t_{s4}$ 738, and $t_{s5}$ 740). The sequence of times associated with the space between the peaks reveals the field of view 702 is not centered in the hatch if $t_{s1} \approx t_{s3} \approx t_{s5} < t_{s2} \approx t_{s4}$.

Features of the additive manufacturing process such as the heating rate the cooling rate, and the peak temperature as described above can be the most metallurgically important features. The half power bandwidth can be used to track these features scan by scan and layer by layer. These features could be used to establish a statistical process control methodology and could answer the question, "is the process under control?"

The following three types of process control can be applied to the described processes based at least in part upon the half power bandwidth or the average half power bandwidth depicted in FIGS. 5 and 6, respectively. First, Process Intervention, or the stopping or interruption of a process for cause based on one or more critical process features going out of a specified range Second, Interlayer process control, or the alteration of process parameters between layers in an additive manufacturing process based on measurements made during the previous layer, quality or feature metrics calculated from such measurements, and a decision algorithm which decides if these features are within specified ranges and if they are not then how to make adjustments to process parameters such as heat source power and travel speed to get the half power bandwidth or other quality metric back into their specified ranges. The third type of process control that can be applied is Intra-layer, or scan-level process control, in which power, travel speed or other process parameters could be changed so that certain quality metrics or features will remain within specified ranges.

The third form of process control is the fastest and requires the fastest control loop. The first form of process control may be viewed as an open loop control with only one outcome, i.e. the process is halted when conditions are seen to drift too far from nominal. The second form is a slower form of real time control and only adjusts parameters on a layer by layer basis.

Figure 9:
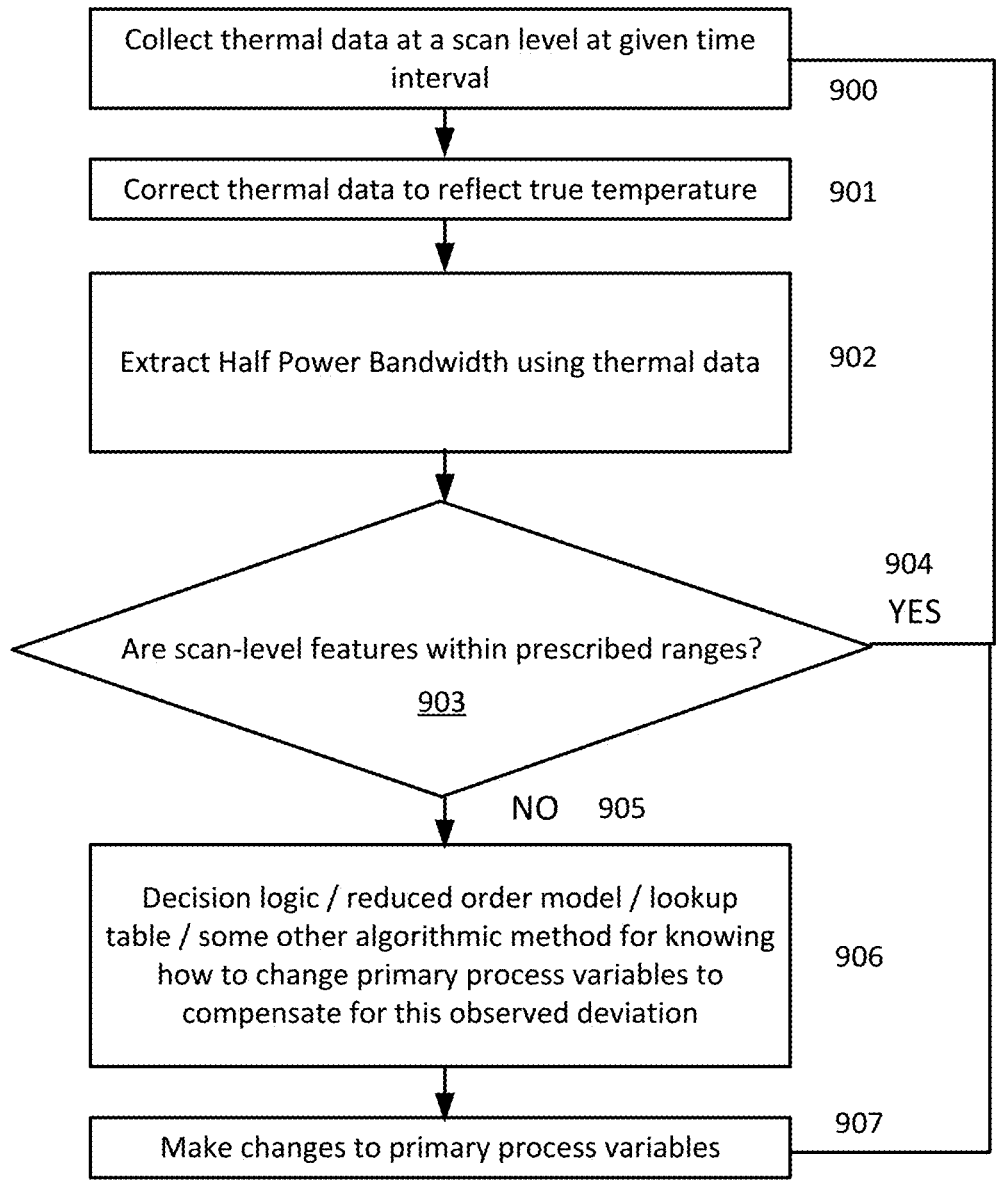
FIG. 9 shows a high level process control flow chart.

FIG. 9 shows a high level process control flow chart which utilizes the process features discussed previously. This diagram shows the process flow for the case of intra-layer or scan by scan control. In such control, a single scan is conducted, calculations are made, and if necessary adjustments are made prior to the next scan. This is therefore envisioned as a fast control loop which makes changes in a millisecond or potentially less. At 800 thermal measurements are taken using one or more Eulerian sensors. In some embodiments, the thermal measurements are received as voltage data. At 901 the thermal measurements can be corrected to reflect a true temperature. At 902, features are extracted such as those discussed above which could include, but are not limited to, such features as the half power bandwidth, the average half power bandwidth, and the time between a first half power bandwidth and a second half power bandwidth. These are features that have metallurgical significance for the material and the as-deposited additive manufacturing buildup.

Then at 903, it is seen whether or not these features are within the prescribed ranges that are known to correspond to nominal process behavior and are known to produce acceptable parts. If the answer is yes, then at 904 the process continues to the next scan with the same process variables/process parameters. Note that there could be hundreds or thousands of scans within a single layer of an additive manufactured part, and there could be thousands of such layers per part. If the result of the query posed in 903 is no, then at 905 the process flow is diverted to a decision at 906. At 906, some methodology that can make a decision based on the magnitude and direction of the deviations observed is applied. This decision logic could be a reduced order process model, or it could be a lookup table or database, or it could be some heuristic scheme like a neural network, or it could be any other algorithmic system that decides which process variables or process parameters to change, by how much, and in which direction (increase or decrease). For example, a change in process variables or process parameters can take the form of changes to the heat source heat output power, travel speed and scan pattern, which can alter the amount of energy introduced to one or more layers of a part.

Then at 907 these new process parameters are utilized to make the next scan based on the data provided by the previous scan, and the process is repeated until the layer and ultimately the part is completed. Generally, increases in power and decreases in heat source travel speed result in greater amounts of heat being added to the part. By adding greater amounts of heat, the solidification rate actually decreases. So, to fix a condition in which solidification is occurring too rapidly, additional heat can be added to the system. Conversely, if solidification of the materials are happening too slowly, then an amount of energy delivered to the part can be reduced, which increases the rate at which solidification occurs. Generally speaking, the rate at which the material solidifies is quite important as cooling rates too far out of bounds tend to degrade the quality of the finished part. Another way to adjust the amount of heat delivered to a particular layer or area is by adjusting the scan pattern. For example, a scan pattern with passes grouped closely together would deliver relatively more heat to the part than another laser otherwise using the same settings but with a broader scan pattern.

Incorporation of Half Power Bandwidth into an aggregation based Analysis System

Figure 10:
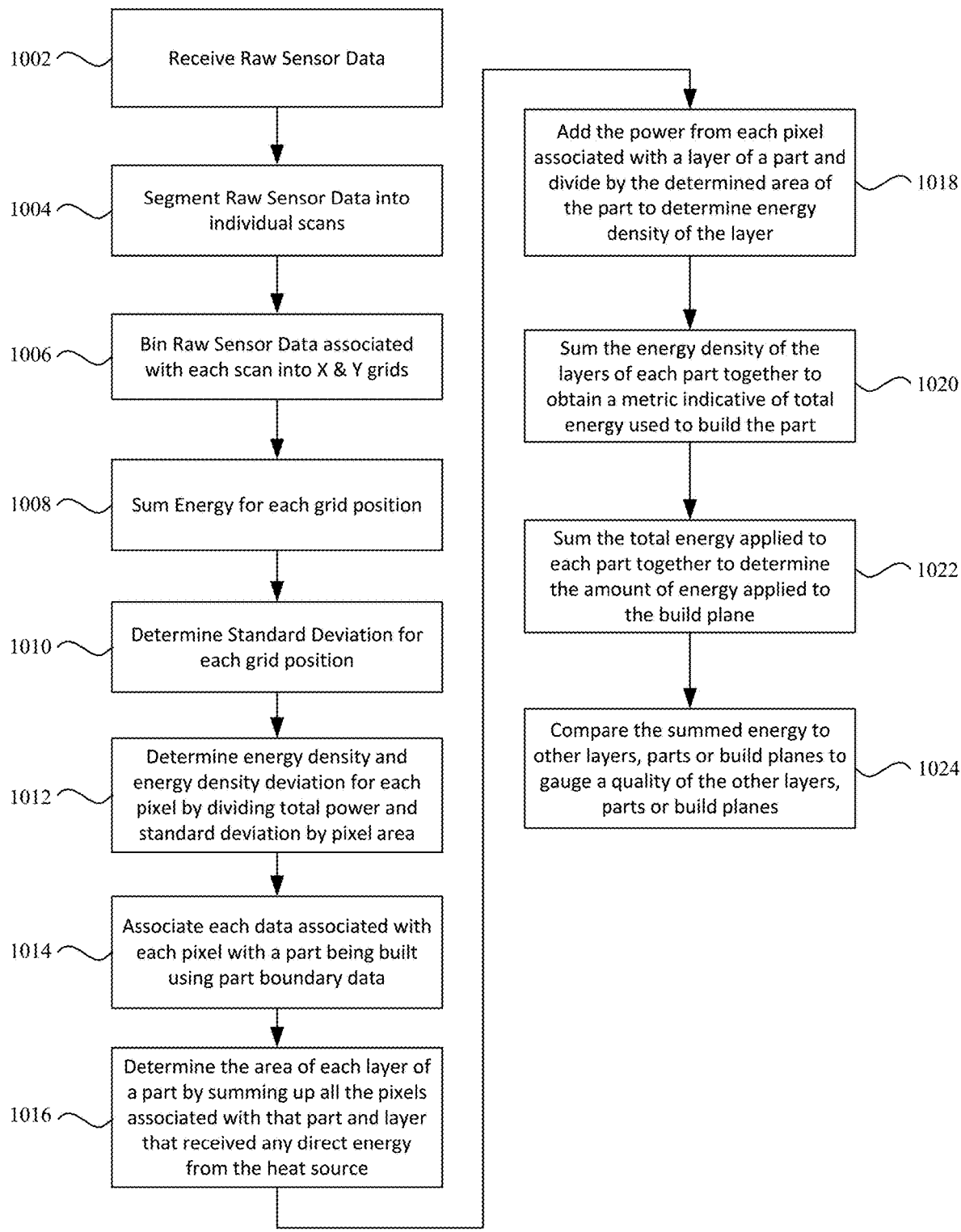
FIG. 10 shows a process in which data recorded by an optical sensor such as a non-imaging photodetector can be processed to characterize an additive manufacturing build process.

FIG. 10 shows a process in which data recorded by an optical sensor such as a non-imaging photodetector can be processed to characterize an additive manufacturing build process. At 1002, raw sensor data is received that can include both build plane intensity data and energy source drive signals correlated together. At 1004, by comparing the drive signal and build plane intensity data, individual scans can be identified and located within the build plane. Generally the energy source drive signal will provide at least start and end positions from which the area across which the scan extends can be determined. At 1006, raw sensor data associated with an intensity or power of each scan can be binned into corresponding X & Y grid regions. In some embodiments, the raw intensity or power data can be converted into energy units by correlating the dwell time of each scan in a particular grid region. Each grid region can have a size corresponding to one or more pixels of an optical sensor monitoring the build plane. It should be noted that different coordinate systems, such as polar coordinates, could be used to store grid coordinates and that storage of coordinates should not be limited to Cartesian coordinates. In some embodiments, different scan types can be binned separately so that analysis can be performed solely on particular scan types. For example, an operator may want to focus on contour scans if those types of scans are most likely to include unwanted variations. At 1008, energy input at each grid region can be summed up so that a total amount of energy received at each grid region can be determined using equation (4).

$$E_{pd_m} = \sum\nolimits_{n=1}^{pixel\ samples\ in\ grid\ cell} E_{pd_n} \qquad \text{Eq. (4)}$$

This summation can be performed just prior to adding a new layer of powder to the build plane or alternatively, summation may be delayed until a predetermined number of layers of powder have been deposited. For example, summation could be performed only after having deposited and fused portions of five or ten different layers of powder during an additive manufacturing process. In some embodiments, a sintered layer of powder can add about 40 microns to the thickness of a part; however this thickness will vary depending on a type of powder being used and a thickness of the powder layer.

At 1010, the standard deviation for the samples detected and associated with each grid region is determined. This can help to identify grid regions where the power readings vary by a smaller or greater amount. Variations in standard deviation can be indicative of problems with sensor performance and/or instances where one or more scans are missing or having power level far outside of normal operating parameters. Standard deviation can be determined using Equation (5).

$$E_{pd_{sm}} = \sqrt{\frac{1}{\text{\# sample-in-location} - 1} \sum_{n=1}^{sample-in-pixel} (E_n - \bar{E})^2} \quad \text{Eq. (5)}$$

At 1012, a total energy density received at each grid region can be determined by dividing the power readings by the overall area of the grid region. In some embodiments, a grid region can have a square geometry with a length of about 250 microns. The energy density for each grid region can be determined using Equation (6).

$$E_{grid\ location} = \frac{\sum_{n=1}^{samples-in-location} E_{pd_n}}{A_{grid\ location}} \quad \text{Eq. (6)}$$

At 1014, when more than one part is being built, different grid regions can be associated with different parts. In some embodiments, a system can included stored part boundaries that can be used to quickly associate each grid region and its associated energy density with its respective part using the coordinates of the grid region and boundaries associated with each part.

At 1016, an area of each layer of a part can be determined. Where a layer includes voids or helps define internal cavities, substantial portions of the layer may not receive any energy. For this reason, the affected area can be calculated by summing only grid regions identified as receiving some amount of energy from the energy source. At 1018, the total amount of power received by the grid regions within the portion of the layer associated with the part can be summed up and divided by the affected area to determine energy density for that layer of the part. Area and energy density can be calculated using Equations (7) and (8).

$$A_{part} = \sum_{n=1}^{part\ pixel} 1(E_{pd_n} > 0) \quad \text{Eq. (7)}$$

$$IPQM_{part_{layer}} = \frac{\sum_{n=1}^{part\ grid\ locations} E_{pd_n}}{A_{part}} \quad \text{Eq. (8)}$$

At 1020, the energy density of each layer can be summed together to obtain a metric indicative of the overall amount of energy received by the part. The overall energy density of the part can then be compared with the energy density of other similar parts on the build plane. At 1022, the total energy from each part is summed up. This allows high level comparisons to be made between different builds. Build comparisons can be helpful in identifying systematic differences such as variations in powder and changes in overall power output. Finally at 1024, the summed energy values can be compared with other layers, parts or build planes to determine a quality of the other layers, parts or build planes.

Other metrics can be summed up or stored in the manner described in FIG. 10. For example, half power bandwidth could be one of these metrics and the method described herein for performing half power bandwidth analysis can be used to gain insight into the additive manufacturing process. The binned half power bandwidth data could be used in many ways. For example, the half power bandwidth values could be averaged for each grid region or the highest max temperature could be associated with each grid region. Alternatively, the mode of the top 5 or 10 percent of the half power bandwidth readings could be associated with the grid region to avoid the situation where a single instance of an elevated half power bandwidth measurement throws off what would otherwise be a more nominal half power bandwidth value.

It should be appreciated that the specific steps illustrated in FIG. 10 provide a particular method of characterizing an additive manufacturing build process according to another embodiment of the present invention. Other sequences of steps may also be performed according to alternative embodiments. For example, alternative embodiments of the present invention may perform the steps outlined above in a different order. Moreover, the individual steps illustrated in FIG. 10 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 11A:
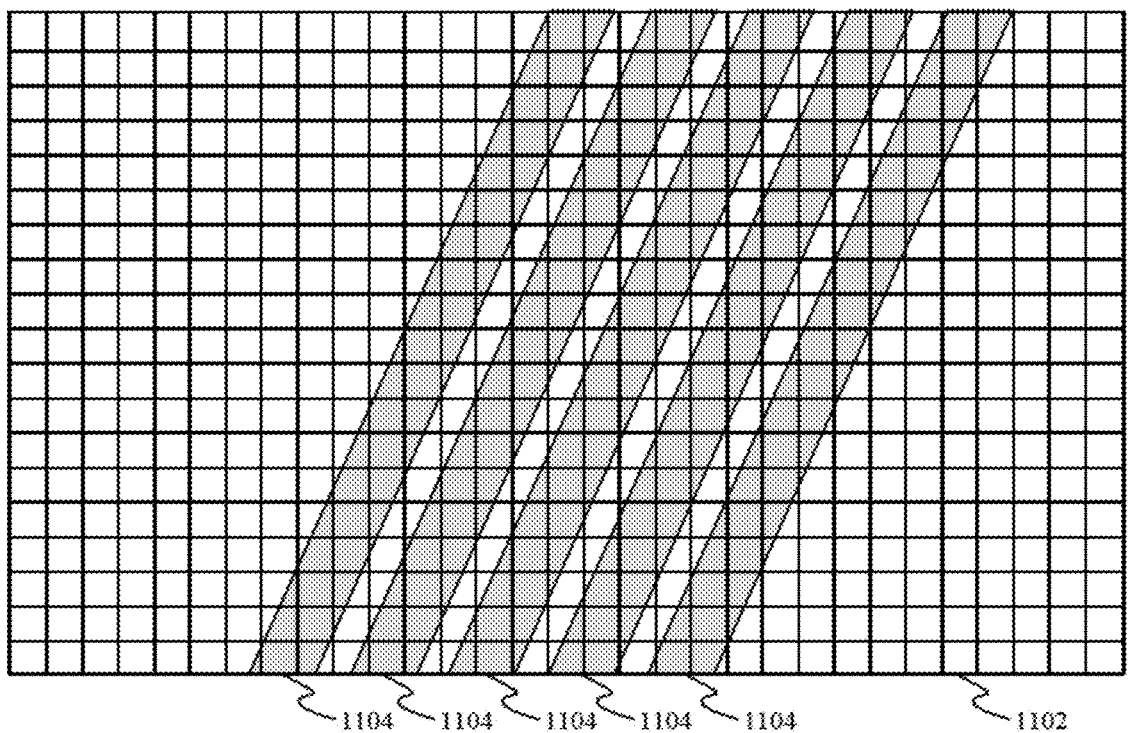
FIGS. 11A-11D show visual depictions indicating how multiple scans can contribute to the power introduced at individual grid regions.
Figure 11B:
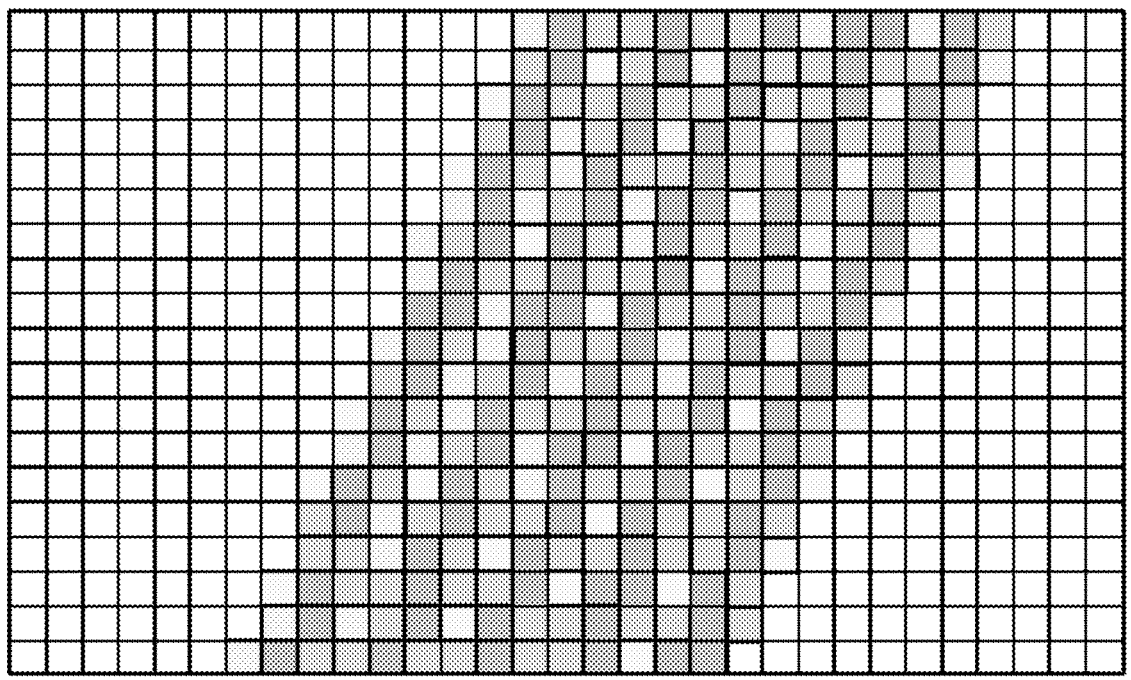

FIGS. 11A-11D show visual depictions indicating how multiple scans can contribute to the power introduced at individual grid regions. FIG. 11A depicts a grid pattern made up of multiple grid regions 1102 distributed across a portion of a part being built by an additive manufacturing system. FIG. 11A also depicts a first pattern of energy scans 1104 extending diagonally across a grid regions 1102. The first pattern of energy scans 1102 can be applied by a laser or other intense source of thermal energy scanning across grid 1104. FIG. 11B shows how the energy introduced across the part is represented in each of grid regions 1102 by a singular gray scale color representative of an amount of energy received where darker shades of gray correspond to greater amounts of energy. It should be noted that in some embodiments the size of grid regions 1102 can be reduced to obtain higher resolution data. Alternatively, the size of grid regions 1102 could be increased to reduce memory and processing power usage.

Figure 11C:
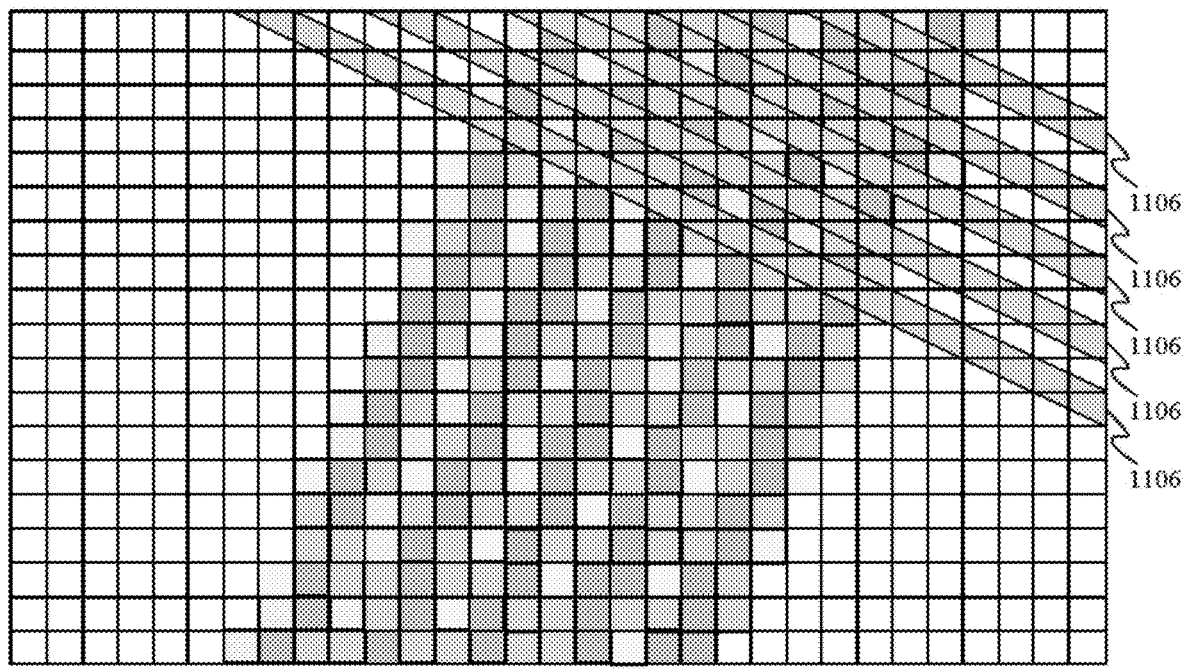
Figure 11D:
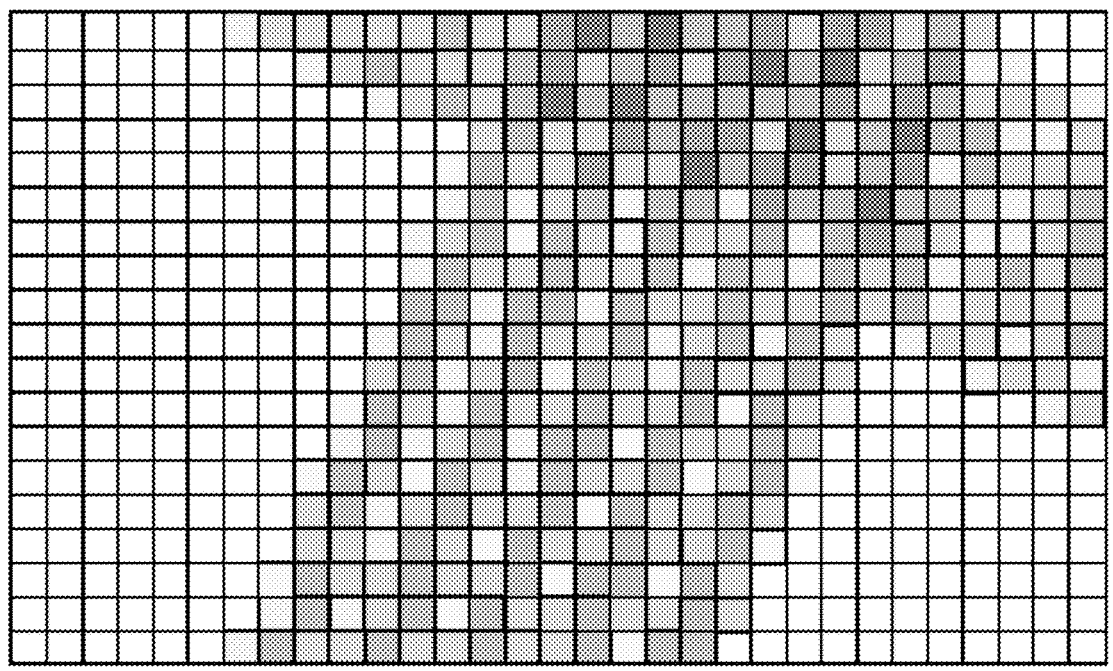

FIG. 11C shows a second pattern of energy scans 1106 overlapping with at least a portion of the energy scans of the first pattern of energy scans. As discussed in the text accompanying FIG. 8, where the first and second patterns of energy scans overlap, grid regions are shown in a darker shade to illustrate how energy from both scans has increased the amount of energy received over the overlapping scan patterns. Clearly, the method is not limited to two overlapping scans and could include many other additional scans that would get added together to fully represent energy received at each grid region.

Figure 12A:
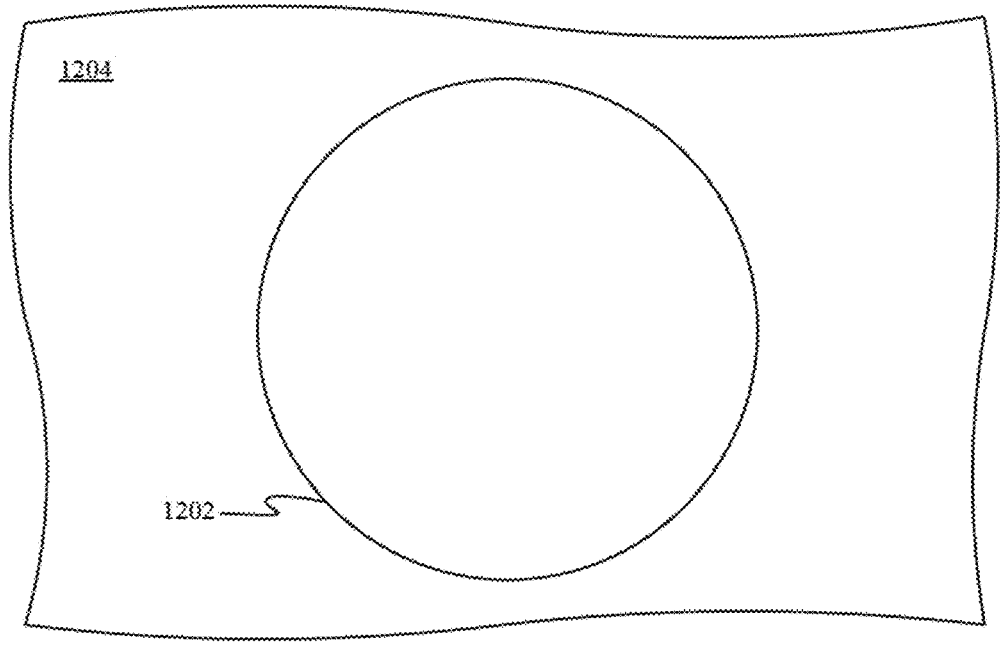
FIGS. 12A-12F illustrate how a grid can be dynamically created to characterize and control an additive manufacturing operation.
Figure 12B:
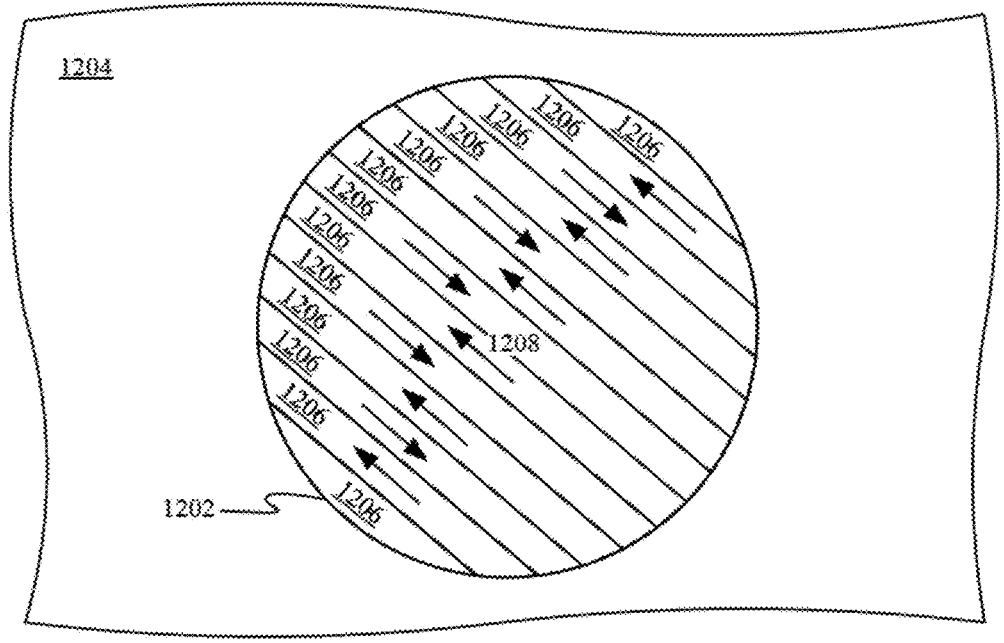

FIGS. 12A-12F illustrate how a grid can be dynamically created to characterize and control an additive manufacturing operation. FIG. 12A shows a top view of a cylindrical workpiece 1202 positioned upon a portion of a build plane 1204. Workpiece 1202 is shown as it undergoes an additive manufacturing operation. FIG. 12B shows how cylindrical workpiece 1202 can be divided into multiple tracks 1206 along which an energy source can melt powder distributed on an upper surface of cylindrical workpiece 1202. In some embodiments, the energy source can alternate directions 1206 as depicted while in other embodiments the energy source can always move in one direction. Furthermore a direction of tracks 1206 can vary from layer to layer in order to further randomize the orientation of scans used to build workpiece 1202.

Figure 12C:
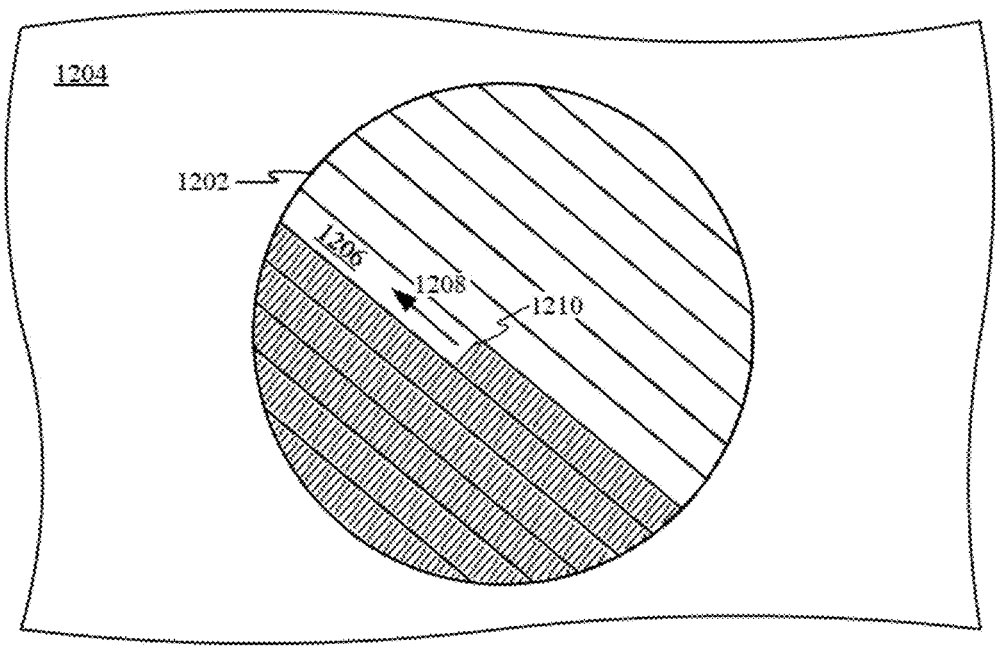

FIG. 12C shows an exemplary scan pattern for the energy source as it forms a portion of workpiece 1202. As indicated, by arrow 1208 a direction of movement of across workpiece 1202 of an exemplary energy source is diagonal. Individual scans 1210 of the energy source can be oriented in a direction perpendicular to the direction of movement of the energy source along track 1206 and extend entirely across track 1206. The energy source can turn off briefly between successive individual scans 1210. In some embodiments, a duty cycle of the energy source can be about 90% as it traverses each of tracks 1206. By employing this type of scan strategy, the energy source can cover a width of track 1206 as it traverses across workpiece 1202. In some embodiments, swath 1210 can have a width of about 5 mm. This can substantially reduce the number of tracks needed to form workpiece 1202 as in some embodiments a width of a melt pool generated by the energy source can be on the order of about 80 microns.

Figure 12D:
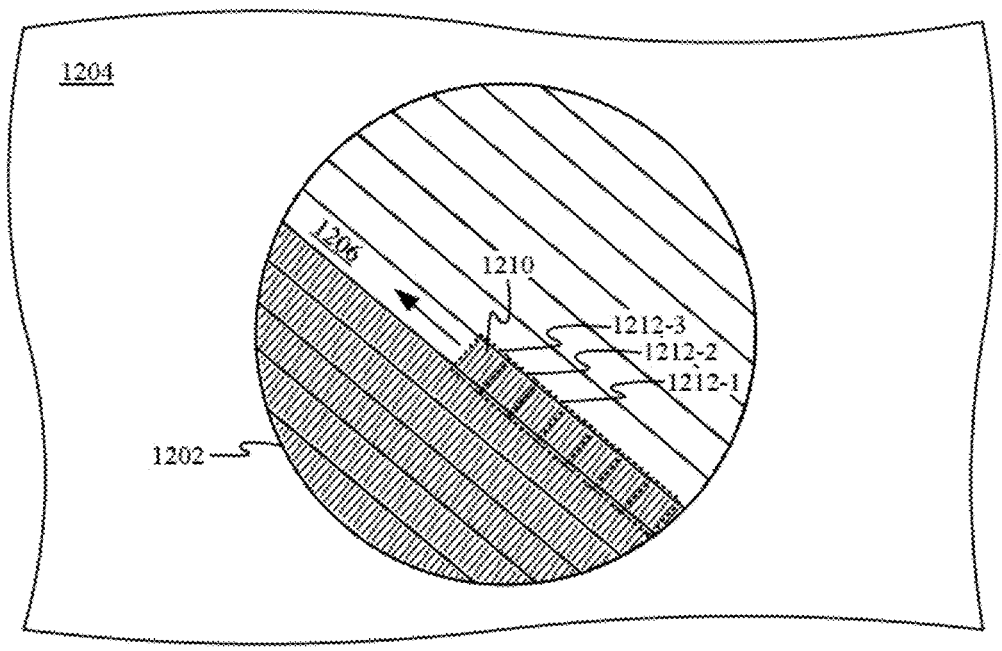
Figure 12E:
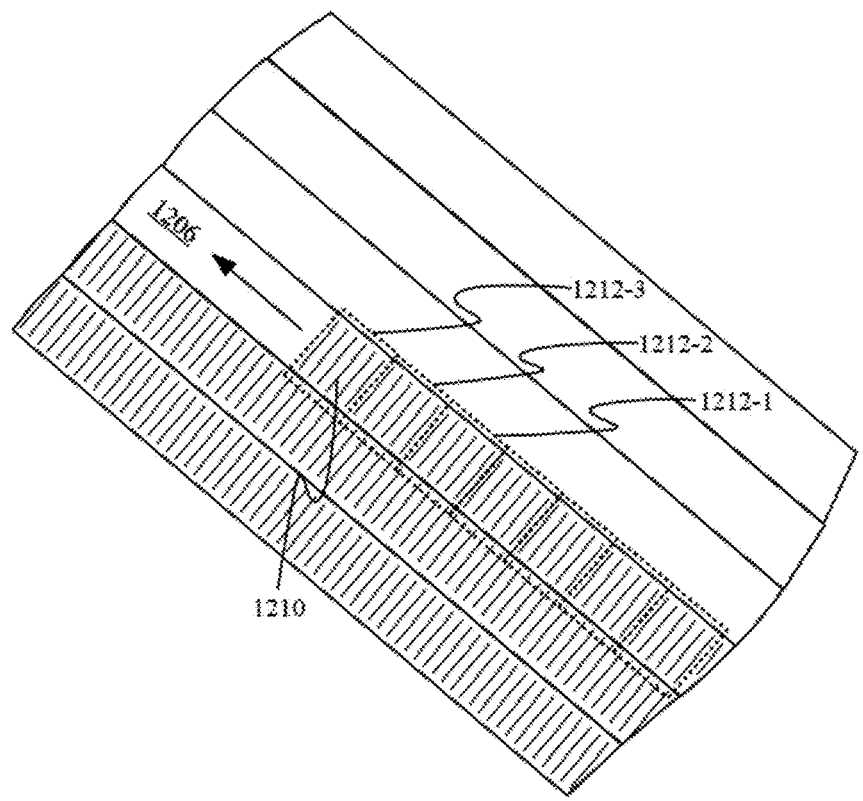

FIGS. 12D-12E show how grid regions 1212 can be dynamically generated along each track 1206 and be sized to accommodate a width of each individual scan 1210. A precise position of subsequent scans can be forecast by the system by referencing energy source drive signals enroute to the energy source. In some embodiments, the width of grids 1212 can match the length of individual scans 1210 or be within 10 or 20% of the length of individual scans 1210. Again, scan length of individual scans 1210 can be anticipated by referencing the energy source drive signals. In some embodiments, grid regions 1212 can be square or rectangular in shape. A thermal energy density can be determined for each of grid regions 1212 as the energy source continues along track 1206. In some embodiments, thermal energy density readings within grid region 1212-1 could be used to adjust an output of the energy source within the next grid region, grid region 1212-2 in this case. For example, if the thermal energy density readings generated by individual scans 1210 within grid region 1212-1 are substantially higher than expected, energy source power output can be reduced, a speed at which energy source scans across individual scans 1210 can be increased and/or spacing between individual scans 1210 can be increased within grid region 1212-2. These adjustments can be made as part of a closed loop control system. While FIG. 12E clearly shows only five individual scans 1210 are shown within each grid region 1212, this is depicted in this manner for exemplary purposes only and the actual number of individual scans within a grid region 1212 can be substantially higher or in some cases lower. For example, where the melt zone generated by the energy source is about 80 microns wide it could take about 60 individual scans 1210 in order for all the powder within a 5 mm square grid region 1212 to fall within the melt zone.

Figure 12F:
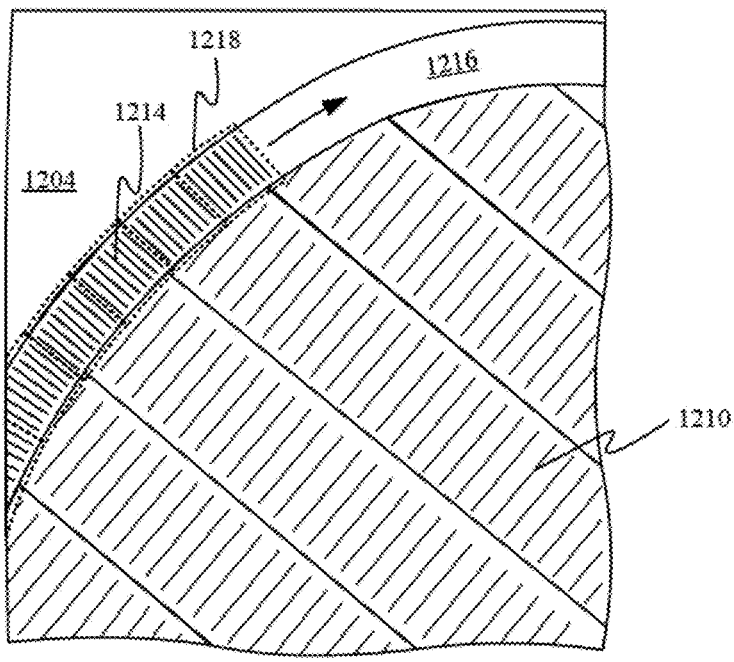

FIG. 12F shows an edge region of workpiece 1202 once the energy source finishes traversing the pattern of tracks 1206. In some embodiments, the energy source can continue to add energy to workpiece 1202 subsequent to a majority of the powder having been melted and resolidified. For example, contour scans 1214 can track along an outer periphery 1216 of workpiece 1202 in order to apply a surface finish to workpiece 1202. It should be appreciated that contour scans 1214 as depicted are substantially shorter than individual scans 1210. For this reason, grid regions 1218 can be substantially narrower than grid regions 1212. It should also be noted that grid regions 1218 are not purely rectangular in shape as in this case they follow the contour of the outer periphery of workpiece 1202. Another instances that may result in scan length differences could be where a workpiece includes walls of varying thickness. A variable thickness wall could result in scans length varying within a single grid region. In such a case, an area of each grid region could be kept consistent by increasing the length of the grid region while narrowing the width to conform to changes in the length of individual scans.

Figure 13:
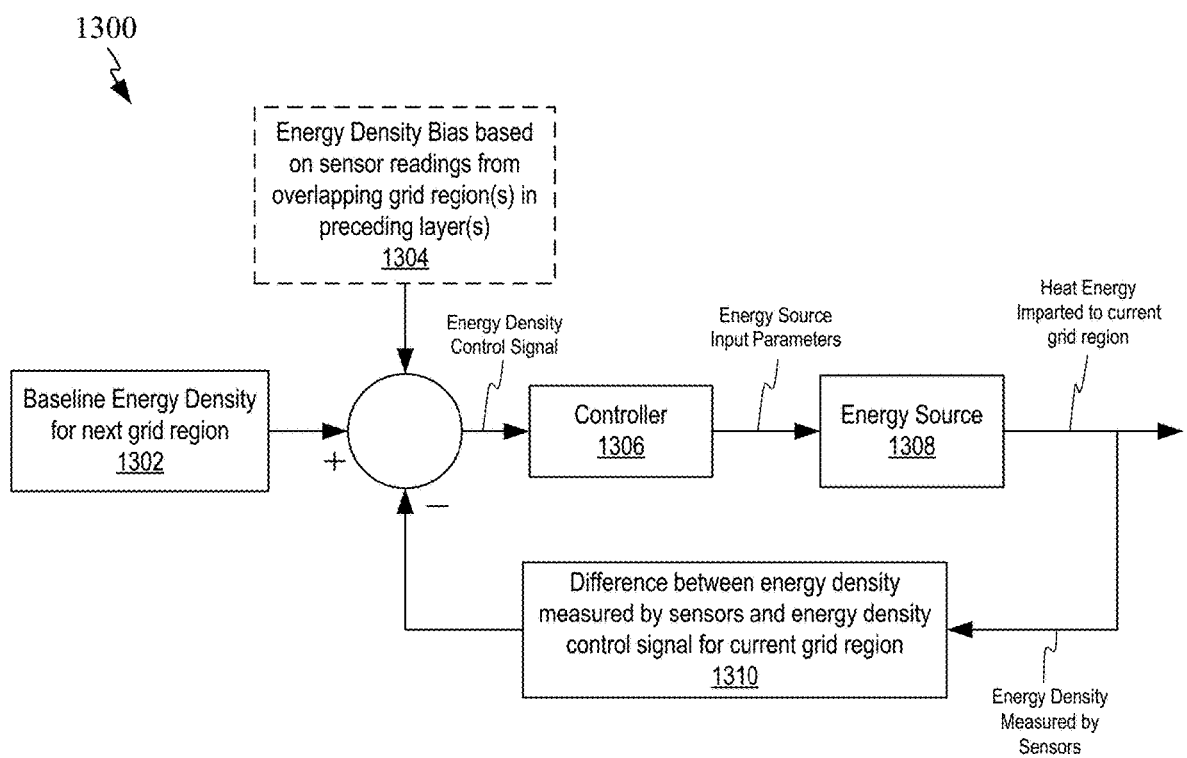
FIG. 13 shows a closed loop control example showing a feedback control loop for establishing and maintaining feedback control of an additive manufacturing operation.

FIG. 13 shows a closed loop control example showing feedback control loop 1300 for establishing and maintaining feedback control of an additive manufacturing operation. At block 1302 a baseline thermal energy density for the next grid region across which the energy source is about to traverse is input into the control loop. This baseline thermal energy density reading can be established from modeling and simulation programs and/or from previously run experimental/test runs. In some embodiments, this baseline thermal energy density data can be adjusted by energy density bias block 1304, which includes energy density readings for various grid regions recorded during preceding layers. Energy density bias block 1304 can include an adjustment to baseline energy density block in instances where preceding layers received too much or too little energy. For example, where optical sensor readings indicate a thermal energy density below nominal in one region of a workpiece, energy density bias values can increase the value of the baseline energy density for grid regions overlapping the grid regions with below nominal thermal energy density readings. In this way, the energy source is able to fuse additional powder that was not fully fused during the preceding layer or layers.

Other metrics besides energy density can be summed up or stored in the manner described in FIGS. 12A-12F. For example, half power bandwidth could be one of these metrics and the method described herein for performing half power bandwidth analysis can be used to gain insight into the additive manufacturing process. The binned half power bandwidth data could be used in many ways. For example, the half power bandwidth values could be averaged for each grid region or the highest max temperature could be associated with each grid region. Alternatively, the mode of the top 5 or 10 percent of the half power bandwidth readings could be associated with the grid region to avoid the situation where a single instance of an elevated half power bandwidth measurement throws off what would otherwise be a more nominal half power bandwidth value.

FIG. 13 also shows how the inputs from block 1302 and 1304 cooperatively create an energy density control signal that is received by controller 1306. Controller 1306 is configured to receive the energy density control signal and generate heat source input parameters configured to generate the desired thermal energy density within the current grid region. Input parameters can include power, scan velocity, hatch spacing, scan direction and scan duration. The input parameters are then received by energy source 1308 and any changes in the input parameters are adopted by energy source 1308 for the current grid region. Once optical sensors measure the scans of energy source 1308 making up the current grid region, at block 1310 thermal energy density for the current grid region is calculated and compared to the energy density control signal. If the two values are the same then no change to energy density control signal is made based upon the optical sensor data. However, if the two values are different the difference is added or subtracted from the energy density control signal for scans made in the next grid region.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. An additive manufacturing method comprising:
   monitoring a temperature of a portion of a build plane during an additive manufacturing operation as a heat source passes across the portion of the build plane;
   determining a threshold temperature;
   identifying a time interval during which the monitored temperature exceeds the threshold temperature; and
   changing a process parameter of the additive manufacturing operation in response to the identified time interval.

2. The additive manufacturing method of claim 1 wherein determining the threshold temperature incudes adjusting the threshold temperature based on a requirement of a specific additive manufacturing operation.

3. The additive manufacturing method of claim 1 wherein changing the process parameter in response to the identified time interval further comprises changing a second process parameter.

4. The additive manufacturing method of claim 1 wherein the process parameter comprises at least one of beam power, beam travel speed, or hatch spacing.

5. The additive manufacturing method of claim 1 wherein the monitoring the temperature is performed with a pyrometer.

6. The additive manufacturing method of claim 1 further comprising:
   determining a plurality of time intervals, wherein each time interval of the plurality of time intervals is associated with a region the portion of the build plane associated with the temperature exceeding the threshold temperature; and
   determining an average time interval associated with the plurality of time intervals.

7. The additive manufacturing method of claim 1 further comprising:
   determining a plurality of time intervals, wherein each time interval of the plurality of time intervals is associated with a region of the portion of the build plane associated with the temperature exceeding the threshold temperature; and
   determining a hatch spacing parameter associated with the plurality of time intervals.

8. The additive manufacturing method of claim 1 wherein the temperature is an observed temperature.

9. The additive manufacturing method of claim 1 wherein the temperature is a true temperature.

10. An additive manufacturing method, comprising:
    a heat source;
    a non-imaging optical sensor configured to measure temperatures across a surface of a material during an additive manufacturing operation in which the material is heated by the heat source; and
    at least one processor configured to collect temperature data from the non-imaging optical sensor, the at least one processor being further configured to:
      monitor a temperature of a portion of a build plane during an additive manufacturing operation, using the non-imaging optical sensor, as a heat source passes through the portion of the build plane;
      detect a peak temperature associated with one or more passes of the heat source through the portion of the build plane;
      determine a threshold temperature;
      identify a time interval during which the monitored temperature exceeds the threshold temperature; and
      change a process parameter of the heat source in response to the monitored temperature exceeding the threshold temperature.

11. The additive manufacturing method of claim 10, wherein determining the threshold temperature incudes adjusting the threshold temperature based on a requirement of a specific additive manufacturing operation.

12. The additive manufacturing method of claim 10, wherein changing the process parameter in response to the monitored temperature exceeding the threshold temperature further comprises changing a second process parameter.

13. The additive manufacturing method of claim 10, wherein the process parameter comprises at least one of beam power, beam travel speed, or hatch spacing.

* * * * *